US011895638B2

(12) United States Patent
Meylan et al.

(10) Patent No.: US 11,895,638 B2
(45) Date of Patent: Feb. 6, 2024

(54) SIGNALING BUFFER SIZE CAPABILITY

(71) Applicant: QUALCOMM Incorporated, San Diego, CA (US)

(72) Inventors: Arnaud Meylan, San Diego, CA (US); Akshay Kumar, San Diego, CA (US); Pulkit Hanswal, San Diego, CA (US); Shailesh Maheshwari, San Diego, CA (US); Arun Prasanth Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/156,495

(22) Filed: Jan. 22, 2021

(65) Prior Publication Data

US 2021/0235465 A1 Jul. 29, 2021

Related U.S. Application Data

(60) Provisional application No. 62/966,404, filed on Jan. 27, 2020.

(51) Int. Cl.
*H04W 72/12* (2023.01)
(52) U.S. Cl.
CPC .................................. *H04W 72/12* (2013.01)
(58) Field of Classification Search
CPC ......... H04W 72/1205; H04W 72/1284; H04W 36/0069; H04W 8/24
See application file for complete search history.

(56) References Cited

U.S. PATENT DOCUMENTS

| 10,959,172 | B2* | 3/2021 | Kim | H04W 52/0229 |
| 2010/0267388 | A1* | 10/2010 | Olsson | H04W 36/38 |
| | | | | 455/436 |
| 2010/0302946 | A1* | 12/2010 | Yang | H04L 47/30 |
| | | | | 370/235 |
| 2013/0083677 | A1* | 4/2013 | Kim | H04W 72/1284 |
| | | | | 370/252 |

(Continued)

FOREIGN PATENT DOCUMENTS

| EP | 3554110 A1 | 10/2019 |
| WO | WO-2013006112 A2 | 1/2013 |
| WO | WO-2016123438 A2 | 8/2016 |

OTHER PUBLICATIONS

International Search Report and Written Opinion—PCT/US2021/014925—ISA/EPO—dated May 19, 2021.

*Primary Examiner* — Stephen J Clawson
(74) *Attorney, Agent, or Firm* — Holland & Hart LLP

(57) ABSTRACT

Methods, systems, and devices for wireless communications are described. A communication device, such as a user equipment may identify a size capability for a buffer associated with a protocol layer of the UE. The buffer may be a layer two buffer and the protocol layer may be a layer two protocol layer. The UE may transmit, to a base station serving the UE, an indication of the identified size capability for the buffer. In some cases, the UE may transmit the indication of the identified size capability in a UE capability report in radio resource control signaling. The UE may then communicate, with the base station 105, data that is scheduled based on the transmitted indication.

30 Claims, 16 Drawing Sheets

(56) References Cited

U.S. PATENT DOCUMENTS

| | | | |
|---|---|---|---|
| 2013/0242726 A1* | 9/2013 | Zhu | H04W 72/1273 370/229 |
| 2014/0293896 A1* | 10/2014 | Kuo | H04L 5/0053 370/329 |
| 2017/0212865 A1* | 7/2017 | Yang | H04W 72/1284 |
| 2019/0124716 A1* | 4/2019 | Hapsari | H04W 72/04 |

* cited by examiner

SIGNALING BUFFER SIZE CAPABILITY

CROSS REFERENCE

The present application for patent claims the benefit of U.S. Provisional Patent Application No. 62/966,404 by MEYLAN et al., entitled "SIGNALING BUFFER SIZE CAPABILITY," filed Jan. 27, 2020, assigned to the assignee hereof, and expressly incorporated by reference herein.

BACKGROUND

The following relates generally to wireless communications, and more specifically to signaling buffer size capability.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, each of which may be otherwise known as a user equipment (UE). Some wireless communications systems may support determination of a size of a buffer as a function of physical layer data rates. As demand for communication efficiency increases, improved techniques for buffer size determination are therefore desired.

SUMMARY

The described techniques relate to improved methods, systems, devices, and apparatuses that support signaling buffer size capability. Generally, the described techniques provide for configuring a communication device, which may be a user equipment (UE), to support signaling of buffer size capability for layer two buffer. For example, the UE signal a capability of the UE to support a size of a buffer to a base station. The size of the buffer signaled may be an actual size or a maximum size supported by the UE. In other example, the UE may select a preferred size of buffer for the UE, and signal the preferred size as the buffer size capability. The communication device, such as a UE, may be operating in a dual-connectivity mode or in a standalone mode. In some examples, the communication device, such as the UE may identify a size capability for a buffer associated with a protocol layer of the UE. For example, the UE may determine a layer two buffer size available at the UE. According to some examples, the UE may transmit an indication of the size capability. For example, the UE may include the indication in a UE capability report, and may transmit the UE capability report via a base station serving the UE. Upon receiving the indication, the base station may determine the size capability for the layer two buffer of the UE. The base station may then determine a schedule of resources to use to transmit data to the UE. In some examples, the schedule of resources may be based on the size capability for the layer two buffer. The UE and the base station may then communicate according to the determined schedule. As demand for communication efficiency increases, the described techniques may provide for signaling of layer two buffer size, to enable the communication device to experience improvements to power consumption, spectral efficiency, higher data rates and, in some examples, may promote enhanced efficiency for high reliability and low latency communication operations, among other benefits.

A method of wireless communication at a UE is described. The method may include identifying a size capability for a buffer associated with a protocol layer of the UE, transmitting, to a base station serving the UE, an indication of the identified size capability for the buffer, and communicating, with the base station, data that is scheduled based on the transmitted indication.

An apparatus for wireless communication at a UE is described. The apparatus may include a processor, memory coupled with the processor, and instructions stored in the memory. The instructions may be executable by the processor to cause the apparatus to identify a size capability for a buffer associated with a protocol layer of the UE, transmit, to a base station serving the UE, an indication of the identified size capability for the buffer, and communicate, with the base station, data that is scheduled based on the transmitted indication.

Another apparatus for wireless communication at a UE is described. The apparatus may include means for identifying a size capability for a buffer associated with a protocol layer of the UE, transmitting, to a base station serving the UE, an indication of the identified size capability for the buffer, and communicating, with the base station, data that is scheduled based on the transmitted indication.

A non-transitory computer-readable medium storing code for wireless communication at a UE is described. The code may include instructions executable by a processor to identify a size capability for a buffer associated with a protocol layer of the UE, transmit, to a base station serving the UE, an indication of the identified size capability for the buffer, and communicate, with the base station, data that is scheduled based on the transmitted indication.

In some examples of the method, apparatuses, and non-transitory computer-readable medium described herein, the communicating may include operations, features, means, or instructions for receiving, from the base station, downlink data scheduled based on the transmitted indication. In some examples of the method, apparatuses, and non-transitory computer-readable medium described herein, the communicating may include operations, features, means, or instructions for receiving, from the base station, scheduling information for uplink data scheduled based on the transmitted indication, and transmitting, to the base station, the uplink data according to the received scheduling information.

In some examples of the method, apparatuses, and non-transitory computer-readable medium described herein, transmitting the indication of the identified size capability may include operations, features, means, or instructions for transmitting the indication of the identified size capability in a UE capability report in radio resource control signaling. In some examples of the method, apparatuses, and non-transitory computer-readable medium described herein, the transmitting may include operations, features, means, or instructions for transmitting the UE capability report via the base station.

Some examples of the method, apparatuses, and non-transitory computer-readable medium described herein may further include operations, features, means, or instructions for transmitting an indication of a preference of the UE associated with allocating the buffer between downlink communications and uplink communications.

In some examples of the method, apparatuses, and non-transitory computer-readable medium described herein, transmitting the indication of the identified size capability may include operations, features, means, or instructions for transmitting, to the base station serving the UE, the indication of the identified size capability in a medium access control (MAC) control element.

Some examples of the method, apparatuses, and non-transitory computer-readable medium described herein may further include operations, features, means, or instructions for determining that the UE may be configured to operate in a dual-connectivity mode, where identifying the size capability for the buffer may be based on determining that the UE may be configured to operate in the dual-connectivity mode. In some examples of the method, apparatuses, and non-transitory computer-readable medium described herein, the dual-connectivity mode includes at least one of a multi-radio dual-connectivity mode, a new radio dual-connectivity mode, long term evolution (LTE) dual-connectivity mode, or a combination thereof.

Some examples of the method, apparatuses, and non-transitory computer-readable medium described herein may further include operations, features, means, or instructions for determining that the UE is configured to operate in at least one of a standalone mode or a dual-connectivity mode, where a second size capability for the buffer is based on the determining that the UE is configured to operate in the standalone mode, and a third size capability for the buffer is based on determining that the UE is configured to operate in the dual-connectivity mode. In some cases, transmitting the indication of the identified size capability for the buffer includes transmitting an indication of the second size capability and the third size capability.

Some examples of the method, apparatuses, and non-transitory computer-readable medium described herein may further include operations, features, means, or instructions for identifying an updated size capability for the buffer based on the identifying a change of activity status of the UE, and transmitting, to the base station serving the UE, a second indication of the updated size capability for the buffer.

Some examples of the method, apparatuses, and non-transitory computer-readable medium described herein may further include operations, features, means, or instructions for identifying the change of activity status of at least one of a set of subscriber identification modules of the UE, a sidelink communication, a position of the UE, or a combination thereof, the updated size capability for the buffer is identified based on the identifying the change of the activity status.

Some examples of the method, apparatuses, and non-transitory computer-readable medium described herein may further include operations, features, means, or instructions for periodically measuring one or more parameters associated with the UE, identifying an updated size capability for the buffer based on the periodically measuring the one or more parameters, and transmitting, to the base station serving the UE, a second indication of the updated size capability for the buffer.

In some examples of the method, apparatuses, and non-transitory computer-readable medium described herein, the indication of the identified size capability may be a first multiplier, and the second indication of the updated size capability may be a second multiplier different from the first multiplier. In some examples of the method, apparatuses, and non-transitory computer-readable medium described herein, the size capability may be pre-configured at the UE.

In some examples of the method, apparatuses, and non-transitory computer-readable medium described herein, the buffer may be a layer two buffer and the protocol layer may be a layer two protocol layer. In some examples of the method, apparatuses, and non-transitory computer-readable medium described herein, the protocol layer may be above a physical layer and below a radio resource control layer.

In some examples of the method, apparatuses, and non-transitory computer-readable medium described herein, the protocol layer may be associated with one or more of a packet data convergence control layer, or a radio link control (RLC) layer, or a MAC layer. In some examples of the method, apparatuses, and non-transitory computer-readable medium described herein, the buffer may be associated with a transmit operation, or a receive operation, or a combination thereof.

A method of wireless communication at a network node is described. The method may include receiving, from a UE, an indication of a size capability for a buffer associated with a protocol layer of the UE, determining the size capability for the buffer of the UE based on the received indication, determining, based on the determined size capability for the buffer, a schedule of resources to use to transmit data to the UE, and communicating, with the UE, the data according to the determined schedule.

An apparatus for wireless communication at a network node is described. The apparatus may include a processor, memory coupled with the processor, and instructions stored in the memory. The instructions may be executable by the processor to cause the apparatus to receive, from a UE, an indication of a size capability for a buffer associated with a protocol layer of the UE, determine the size capability for the buffer of the UE based on the received indication, determine, based on the determined size capability for the buffer, a schedule of resources to use to transmit data to the UE, and communicate, with the UE, the data according to the determined schedule.

Another apparatus for wireless communication at a network node is described. The apparatus may include means for receiving, from a UE, an indication of a size capability for a buffer associated with a protocol layer of the UE, determining the size capability for the buffer of the UE based on the received indication, determining, based on the determined size capability for the buffer, a schedule of resources to use to transmit data to the UE, and communicating, with the UE, the data according to the determined schedule.

A non-transitory computer-readable medium storing code for wireless communication at a network node is described. The code may include instructions executable by a processor to receive, from a UE, an indication of a size capability for a buffer associated with a protocol layer of the UE, determine the size capability for the buffer of the UE based on the received indication, determine, based on the determined size capability for the buffer, a schedule of resources to use to transmit data to the UE, and communicate, with the UE, the data according to the determined schedule.

In some examples of the method, apparatuses, and non-transitory computer-readable medium described herein, the communicating may include operations, features, means, or instructions for transmitting, to the UE, downlink data scheduled based on the received indication. In some examples of the method, apparatuses, and non-transitory computer-readable medium described herein, the communicating may include operations, features, means, or instructions for transmitting, to the UE, scheduling information for uplink data transmission by the UE based on the received indication, and receiving, from the UE, the uplink data according to the transmitted scheduling information.

In some examples of the method, apparatuses, and non-transitory computer-readable medium described herein, determining the size capability may include operations, features, means, or instructions for determining the size capability for the buffer based on the received indication, a size of un-acknowledged data for an uplink communication, an estimate of a size of a reordering buffer for downlink communication based on a state of at least one RLC, or a combination thereof.

In some examples of the method, apparatuses, and non-transitory computer-readable medium described herein, receiving the indication of the size capability may include operations, features, means, or instructions for receiving, from the UE, the indication of the size capability in a UE capability report in a radio resource control signaling. Some examples of the method, apparatuses, and non-transitory computer-readable medium described herein may further include operations, features, means, or instructions for transmitting the UE capability report.

In some examples of the method, apparatuses, and non-transitory computer-readable medium described herein, receiving the indication of the size capability may include operations, features, means, or instructions for receiving, from the UE, the indication of the size capability in a MAC control element. In some examples of the method, apparatuses, and non-transitory computer-readable medium described herein, the indication of the size capability for the buffer may be based on the UE operating in a dual-connectivity mode.

In some examples of the method, apparatuses, and non-transitory computer-readable medium described herein, the dual-connectivity mode includes at least one of a multi-radio dual-connectivity mode, a new radio dual-connectivity mode, LTE dual-connectivity mode, or a combination thereof. In some examples of the method, apparatuses, and non-transitory computer-readable medium described herein, the indication of the size capability for the buffer may be based on the UE operating in a standalone mode.

Some examples of the method, apparatuses, and non-transitory computer-readable medium described herein may further include operations, features, means, or instructions for receiving, from the UE, a second indication of a second size capability for the buffer and a third indication of a third size capability for the buffer, where the second size capability for the buffer is based on the UE operating in the standalone mode, and the third size capability for the buffer is based on the UE operating in the dual-connectivity mode, and determining the second size capability for the buffer based on the second indication and the third size capability for the buffer based on the third indication, where receiving the indication of the size capability for the buffer includes receiving the second indication and the third indication.

Some examples of the method, apparatuses, and non-transitory computer-readable medium described herein may further include operations, features, means, or instructions for receiving, from the UE, a second indication of an updated size capability for the buffer, where the second indication of the updated size capability for the buffer may be based on a periodic measurement of one or more parameters at the UE, and determining the updated size capability for the buffer based on the second indication.

In some examples of the method, apparatuses, and non-transitory computer-readable medium described herein, the indication of the identified size capability may be a first multiplier, and the second indication of the updated size capability may be a second multiplier different from the first multiplier. Some examples of the method, apparatuses, and non-transitory computer-readable medium described herein may further include operations, features, means, or instructions for receiving, from the UE, a second indication of an updated size capability for the buffer, where the second indication of the updated size capability for the buffer may be based on a change of activity status of a set of subscriber identification modules of the UE, and determining the updated size capability for the buffer based on the second indication.

Some examples of the method, apparatuses, and non-transitory computer-readable medium described herein may further include operations, features, means, or instructions for receiving, from the UE, an indication of a preference of the UE associated with allocating the buffer between downlink communications and uplink communications, and scheduling the downlink communications and the uplink communications based at least in part on the indication of the preference of the UE associated with allocating the buffer.

In some examples of the method, apparatuses, and non-transitory computer-readable medium described herein, the size capability may be pre-configured at the UE. In some examples of the method, apparatuses, and non-transitory computer-readable medium described herein, the buffer may be a layer two buffer and the protocol layer may be a layer two protocol layer.

In some examples of the method, apparatuses, and non-transitory computer-readable medium described herein, the protocol layer may be above a physical layer and below a radio resource control layer. In some examples of the method, apparatuses, and non-transitory computer-readable medium described herein, the protocol layer may be associated with one or more of a packet data convergence control layer, or a radio link control layer, or a MAC layer. In some examples of the method, apparatuses, and non-transitory computer-readable medium described herein, the buffer may be associated with a transmit operation or a receive operation or both.

DETAILED DESCRIPTION

Figure 1:
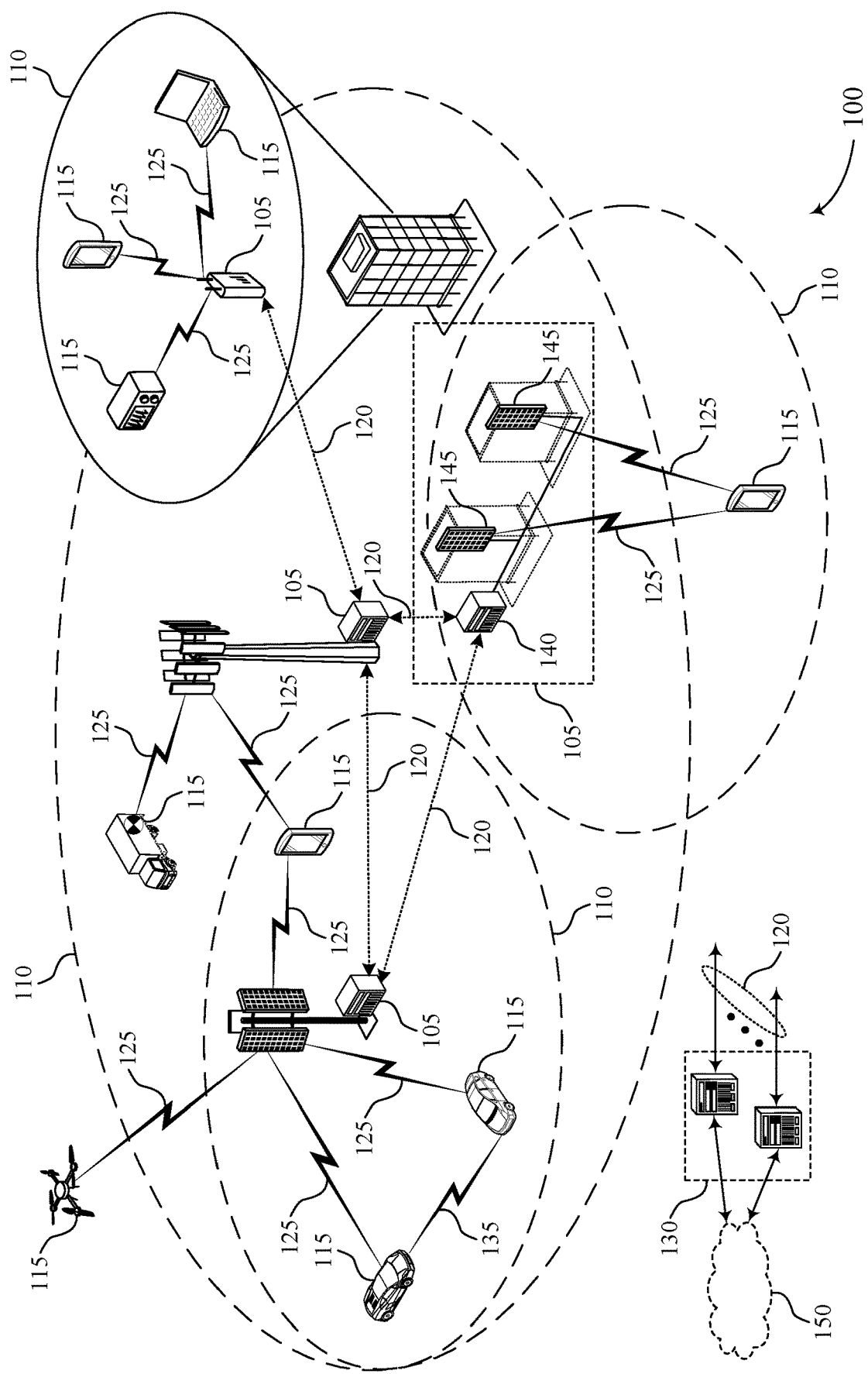
FIG. 1 illustrates an example of a wireless communications system that supports signaling buffer size capability in accordance with aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may, in some examples, support one or more of the above example radio access technologies in accordance with operating in a dual-connectivity mode. The mode may thus allow the communication devices to simultaneously transmit and receive information (e.g., in the form of packets) on multiple component carriers from at least two cell groups via a master base station (e.g., a master eNB (MeNB), a master gNB (MgNB)) and a secondary base station (e.g., a secondary eNB (SeNB), a secondary gNB (SgNB)). The component carriers may be configured into a primary cell and a secondary cell. In some examples, the master base station may correspond to the primary cell, while the secondary base station may correspond to the secondary cell.

The primary cell may, in some examples, correspond to one radio access technology while the secondary cell may correspond to another radio access technology. For example, the primary cell may correspond to LTE, while the secondary cell may correspond to NR. Alternatively, the primary cell may correspond to NR, while the secondary cell may correspond to LTE. The primary cell may, in some examples, include one component carrier in time division duplex (TDD) mode, or one downlink component carrier and one uplink component carrier in frequency division duplex (FDD) mode. Similarly, each secondary cell may, in some examples, include one component carrier in TDD mode, or one downlink component carrier and optionally one uplink component carrier in FDD mode. The communication devices may communicate with one or more of the primary cell or the secondary cell on one or more of the configured component carriers.

In some examples, the communication devices may support one or more methods for managing layer two buffer usage. Specifically, a UE may signal an indication of a size capability to the base station. According to one or more aspects, a UE may identify a size capability for a buffer associated with a protocol layer of the UE. For instance, the UE may identify that it supports a length of the buffer associated with the protocol layer of the UE (e.g., a size of an amount of buffered data at the protocol layer). In some examples, the UE may determine the size capability as a size of a buffer where a UE stores packets for a layer two operation (such as, transmit or receive operations), as a function of physical layer data rates. In some aspects, the buffer size may be defined as a sum of a number of bytes that the UE is capable of storing in transmission and reception windows for multiple radio bearers. In one example, the size capability may be pre-configured at the UE. In some cases, the buffer may be a layer two buffer and the protocol layer may be a layer two protocol layer, where the protocol layer is above a physical layer and below a radio resource control layer. In some examples, the protocol layer may be associated with one or more of a packet data convergence control layer, or a radio link control (RLC) layer, or a medium access control (MAC) layer. The layer two buffer may be associated with a transmit operation, or a receive operation, or a combination thereof. Upon determining the size capability, the UE may report an indication of the size capability to the base station. For example, the UE may report the size capability as one or more parameters in a UE capability report. The UE may then communicate, with the base station, data that is scheduled based on the transmitted indication.

Particular aspects of the subject matter described in this disclosure may be implemented to realize one or more of the following potential advantages. The techniques employed by the described one or more communication devices may provide benefits and enhancements to the operation of the communication devices. For example, operations performed by the described one or more communication devices may provide improvements to power consumption when operating under a dual-connectivity mode. In some examples, signaling buffer size capability may support improvements to spectral efficiency, higher data rates and, in some examples, may promote enhanced efficiency for high reliability and low latency communication operations, among other benefits.

Aspects of the disclosure are initially described in the context of a wireless communications system and process flows. Aspects of the disclosure are further illustrated by and described with reference to apparatus diagrams, system diagrams, and flowcharts that relate to signaling buffer size capability.

FIG. 1 illustrates an example of a wireless communications system 100 that supports signaling buffer size capability in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T\_s=1/((\Delta f\_max \cdot N\_f))$ seconds, where $\Delta f\_max$ may represent the maximum supported subcarrier spacing, and $N\_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N_) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the radio resource control protocol layer may provide establishment, configuration, and maintenance of a radio resource control connection between a UE 115 and a base station 105 or a core network 130 supporting radio bearers for user plane data. At the physical layer, transport channels may be mapped to physical channels.

In current wireless communications systems, a layer two buffer is described as a buffer where a UE stores data for a layer two transmit or receive operations. In some wireless communications systems, a network node may determine a layer two buffer size as a maximum size of a layer two buffer calculated as a function of physical layer data rates. In some examples, it can be challenging to allocate memory in a UE for layer two operations, for example in dual-connectivity applications. If an available memory in a UE is less than the layer two buffer size estimated at a network node (e.g., base station), then the UE may buffer more data than the capability of the UE. In such cases, the UE may discard packets or otherwise avoid buffer overrun that may waste air interface resources. Thus, there is a need to inform the base station about a memory available for a layer two buffer in the UE.

To manage layer two buffer usage, the UEs 115 and the base stations 105 may support layer two buffer size capability reporting to increase reliability and reduce latency in communications (e.g., over a communication link 125). The UE 115 may identify a size capability for a buffer associated with a protocol layer of the UE 115. The UE 115 may then transmit, to a base station 105 serving the UE 115, an indication of the identified size capability for the buffer and communicate, with the base station 105, data that is scheduled based on the transmitted indication.

Figure 2:
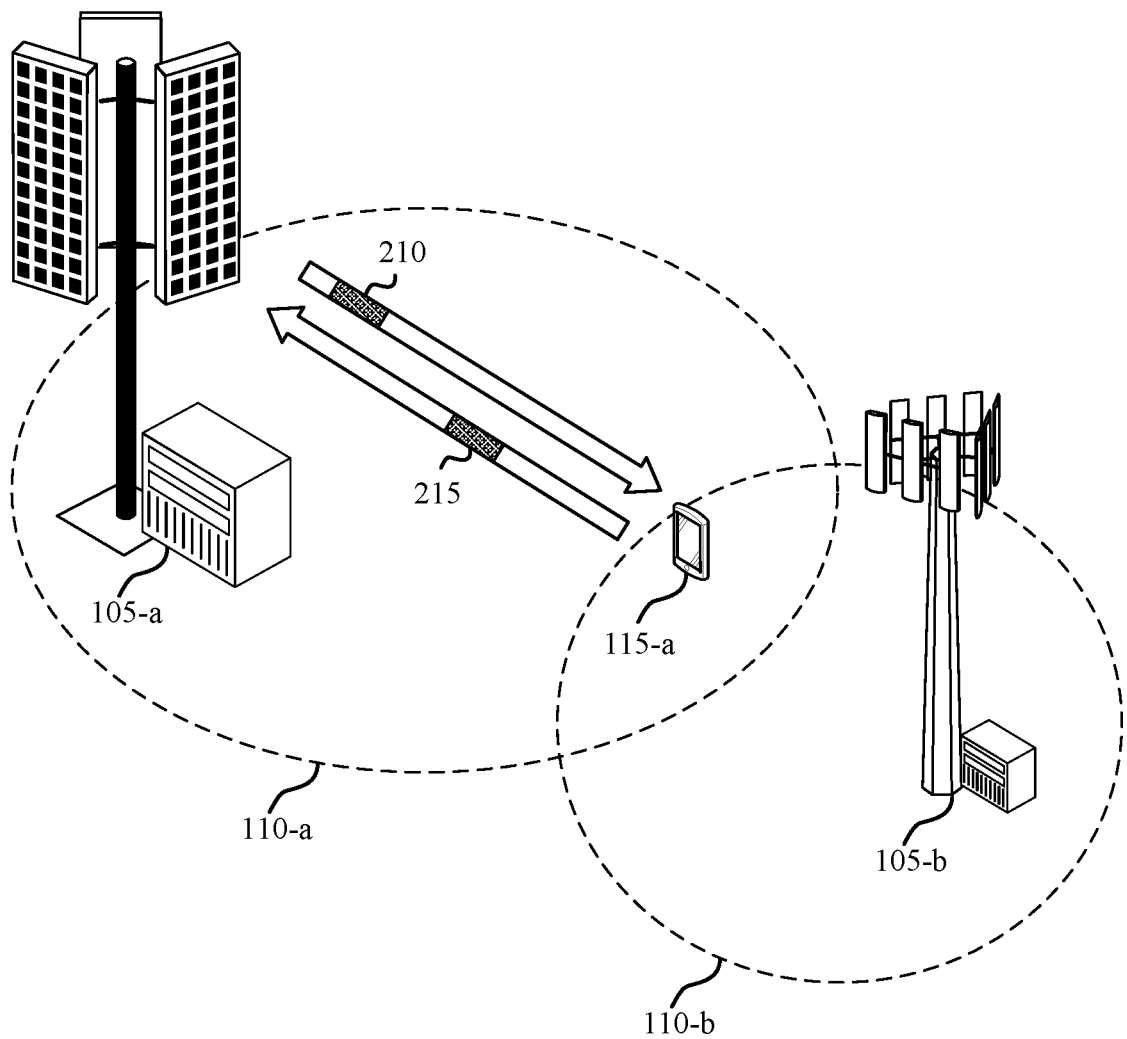
FIG. 2 illustrates an example of a wireless communications system that supports signaling buffer size capability in accordance with aspects of the present disclosure.

FIG. 2 illustrates an example of a wireless communications system 200 that supports signaling buffer size capability in accordance with aspects of the present disclosure. In some examples, the wireless communications system 200 may implement aspects of wireless communications system 100. The wireless communications system 200 may include a base station 105-a and a UE 115-a within a geographic coverage area 110-a, as well as a base station 105-b and the UE 115-a within a geographic coverage area 110-b. The base station 105-a, the base station 105-b, and the UE 115-a may be examples of base stations 105 and UEs 115 as described herein. In some examples, the wireless communications system 200 may support multiple radio access technologies including 4G systems such as LTE systems, LTE-A systems, or LTE-A Pro systems, and 5G systems which may be referred to as NR systems or NR communications systems. In some examples, the wireless communications system 200 may implement aspects of the wireless communications system 100 to support improvements to power consumption, spectral efficiency, higher data rates and, in some examples, may promote enhanced efficiency for high reliability and low latency communication operations, among other benefits.

In the example of FIG. 2, the UE 115-a may support one or more of the above example radio access technologies, such as LTE and NR in accordance with operating in a dual-connectivity mode. The mode may thus allow the UE 115-a to simultaneously transmit and receive information (e.g., in the form of packets) on multiple component carriers from at least two cell groups via a master cell group (MCG) corresponding to a master base station (e.g., an MeNB, an MgNB) and a secondary cell group (SCG) corresponding to a secondary base station (e.g., an SeNB, an SgNB). Base station 105-a may be associated with a first group of cells associated with a first RAT (such as LTE cell group). Base station 105-b may be associated with a second group of cells associated with a second RAT (such as NR cell group).

According to one or more aspects of the present disclosure, the UE 115-a may be configured to operate in dual-connectivity mode to communicate with the base station 105-a and the base station 105-b concurrently or simultaneously using aspects of the described buffer size signaling techniques. In one example, the base station 105-a may be referred to as the master base station, while the base station 105-b may be referred to as the secondary base station. In some examples, the base station 105-a may correspond to the MCG that includes the primary cell (which may correspond to the coverage area 110-a), while the base station 105-b may correspond to the SCG that includes the secondary cell (which may correspond to the coverage area 110-b). In some examples, the SCG may include a primary secondary cell, as well as one or more secondary cells.

In some aspects, the wireless communications system 200 may support aspects of buffer size signaling operations. 5G systems may provide for protocol stack layers including a layer one, a layer two, and a layer three. In the 5G systems (such as, wireless communications system 200), the layer one may be referred to as a physical layer, the layer two may be referred to as a protocol layer and the layer three may be referred to as a radio resource control layer. The layer two protocol layer may be associated with one or more of a packet data convergence control layer, or an RLC layer, or a MAC layer. According to some aspects, a layer two of NR systems may be split into the one or more sub layers. For instance, the sub layers may include a service data adaptation protocol, a PDCP, an RLC, and a MAC. In some cases, the protocol layer (or layer two) may be above a physical layer and below a radio resource control layer. In some examples, the MAC layer may receive one or more transport channels from the physical layer.

The MAC layer may then determine one or more logical channels based on the one or more transport channels, and the MAC layer may transmit the one or more logical channels to the RLC layer. For instance, the MAC layer may determine a mapping between logical channels and transport channels, and may forward the logical channels to the RLC layer. The MAC layer may multiplex or demultiplex MAC service data units belonging to the same or different logical channels into or from transport blocks delivered to or from the physical layer on transport channels.

The RLC layer may determine one or more RLC channels and send the one or more RLC channels to the packet data convergence control layer. In some aspects, the packet data convergence control layer may determine and forwards one or more radio bearers to the service data adaptation protocol. The service data adaptation protocol may determine one or more quality of service flows based on the received radio bearers. For instance, the service data adaptation protocol may map between a quality of service flow and a data radio bearer, mark quality of service flow identifiers in both downlink and uplink packets.

In NR communications systems, a layer two buffer size is described as a maximum size of a buffer where a UE stores packets for a layer two operation (such as, transmit or receive operations), as a function of physical layer data rates. Specifically, the total layer two buffer size may be defined as a sum of a number of bytes that the UE is capable of storing in the RLC transmission windows and RLC reception and reordering windows and a number of bytes that the UE is capable of storing in packet data convergence control reordering windows for all radio bearers. That is, in some communications systems, a buffer size for layer two operations is defined as a function of supported physical layer data rates. In some examples, layer two buffer may be used for downlink as well as uplink operations. In an example of an uplink operation, the layer two buffer may be used to store RLC/packet data convergence control service data units until they are acknowledged by the network. That is, in an uplink operation, the layer two buffer may be used to store RLC/packet data convergence control service data units for availability during a retransmission. According to some aspects, a total layer two buffer size in dual-connectivity mode may be determined as a maximum value of the calculated values based on the following equations ((1) and (2)) (such as equations described in 3rd Generation Partnership Project (3GPP) Technical Specification 38.306):

[MaxULDataRate_MN*RLCRTT_MN+
 MaxULDataRate_SN*RLCRTT_SN+
 MaxDLDataRate_SN*RLCRTT_SN+MaxDL-
 DataRate_MN*(RLCRTT_SN+*X2/Xn* delay+
 Queuing in SN)]    (1)

[MaxULDataRate_MN*RLCRTT_MN+
 MaxULDataRate_SN*RLCRTT_SN+
 MaxDLDataRate_MN*RLCRTT_MN+MaxDL-
 DataRate_SN*(RLCRTT_MN+*X2/Xn* delay+
 Queuing in MN)]    (2)

If a UE is not operating in a dual-connectivity mode, then a serving base station may determine a total layer two buffer size based on the following equation (3):

[MaxDLDataRate*RLC RTT+MaxULDataRate*RLC
 RTT]    (3)

As described herein, a master node may also be referred to as MN and a secondary node may also be referred to as SN. In current wireless communications systems, a serving base station may determine a size of a given UE layer two buffer as a maximum total layer two buffer size of all the calculated buffer sizes for each band combination and an applicable feature set combination in a supported multi-radio dual-connectivity or NR dual-connectivity band combinations among the combinations reported by the UE in the capability message. As described herein, the RLC roundtrip time (RLC RTT) for NR cell group may correspond to a smallest subcarrier spacing (SCS) numerology supported in the band combination and the applicable feature set combination. Additionally, the size of the layer two buffer may be calculated based on the following values:

X2/Xn delay+Queuing in SN=25 ms if SCG is NR, and 55 ms if SCG is E-UTRA
X2/Xn delay+Queuing in MN=25 ms if MCG is NR, and 55 ms if MCG is E-UTRA
RLC RTT for E-UTRA cell group=75 ms
RLC RTT for NR cell group is defined in Table 1:

TABLE 1

RLC RTT for NR cell group per SCS

| SCS (kHz) | RLC RTT (ms) |
|---|---|
| 15 kHz | 50 |
| 30 kHz | 40 |
| 60 kHz | 30 |
| 120 kHz | 20 |

Additionally, current wireless communications systems support various UE capabilities. Some UEs having a capability to support 5G operations may include a limited amount of memory available for layer two operations. In one example, the total memory in a UE may be limited in a standalone modem, for cost and form factor. In some instances a cost of an NR IoT device may be kept low. In some other examples, the UE may have a limited amount of available memory because the memory in the UE may be shared with other memory intensive tasks. In some other examples, the UE may be able to provision more memory than indicated herein, which can provide increased performance. In some communications systems, the base station may determine a layer two buffer size for the UE (e.g., using equations 1, 2, and 3) without being aware of the available memory at the UE. Thus, it may be challenging for UEs configured to operate in 5G systems to allocate memory for layer two operations, for example in dual-connectivity applications, and the UE may buffer more than the UE is able. In some communications systems, the UE may discard packets or otherwise take other steps to avoid buffer overrun that may waste air interface resources. There may exist a need to inform the base station about the memory available in the UE, such that the scheduling is adjusted accordingly while maximizing efficiency.

One or more aspects of the present disclosure may provide for managing the layer two buffer usage by signaling a UE buffer capability (or capability) to the base station. According to one or more aspects, a UE 115-*a* may be configured to report the capability as one or more parameters (e.g., UE_buf_capability_DC and/or UE_buf_capability). The UE 115-*a* may transmit an indication 215 of the buffer size capability to the base station. The base station then schedules data according to the transmitted capability to avoid overrunning the UE's buffer.

In some cases, the UE 115-*a* may identify a size capability for a layer two buffer of the UE. In one example, the size capability is pre-configured at the UE 115-*a*. The UE 151-*a* may transmit an indication 215 of the identified size capability to a base station (e.g., base station 105-*a* and/or base station 105-*b*) serving the UE. For example, the UE 115-*a* may determine a layer two buffer size supported by the UE 115-*a*, and may determine a parameter (e.g., UE_buf_capability_DC and/or UE_buf_capability) based on the layer two buffer size. In some examples, the UE 115-*a* may determine the layer two buffer size based on an operating mode of the UE 115-*a*. For instance, the UE 115-*a* may determine a first size of the layer two buffer based on determining that the UE 115-*a* is configured to operate in a dual-connectivity mode and the UE 115-*a* may determine a second size of the layer two buffer based on determining that the UE 115-*a* is configured to operate in a standalone mode. Accordingly, the UE 115-*a* may determine a first indication (e.g., UE_buf_capability_DC) based on the first size of the layer two buffer, and the UE 115-*a* may determine a second indication (e.g., UE_buf_capability) based on the second size of the layer two buffer. In some cases, the UE 115-*a* may transmit the indication 215 of the identified size capability in a UE capability report in radio resource control signaling. In some examples, the UE 115-a may transmit an indication of a preference of the UE associated with allocating the buffer between downlink communications and uplink communications. For example, a UE 115-a preferring a high speed uplink may request or otherwise allocate a higher percentage (e.g., 80 percent) of buffer for uplink communications and vice-versa. That is, a UE 115-a preferring a high speed downlink may request or otherwise allocate a higher percentage of buffer for downlink communications. The direction with more memory may have a higher throughput. The base station 105 in conjunction with the core network may schedule downlink or uplink data according to an estimate of an amount of UE buffer used for downlink and uplink respectively. For example, the base station receive, from the UE, an indication of a preference of the UE associated with allocating the buffer between downlink communications and uplink communications. The base station may then schedule the downlink communications and the uplink communications based on the indication of the preference of the UE associated with allocating the buffer. Additionally or alternatively, the UE 115-a may transmit the UE capability report to a core network via the serving base station. In some cases, the UE 115-a may transmit the indication 215 of the identified size capability in a MAC control element. In one example, the buffer may be "X" in case of a dual-sim single-active subscription, and may become "Y" in case of dual-sim dual-active (DSDA) subscription, as the physical memory is shared between subscriptions.

In some aspects, the UE 115-a may communicate, with the base station, data that is scheduled based on the transmitted indication 215 (e.g., UE_buf_capability_DC and UE_buf_capability). For example, a network node (e.g., the base station) may determine a layer two buffer size for the UE based on the capability reported by the UE 115-a. In some examples, the indicated parameters (e.g., UE_buf_capability_DC and UE_buf_capability) may take a value based on the following equation (4):

$$i*0.05, i=\{1,\ldots,20,21,\ldots,100\} \quad (4)$$

According to one or more aspects of the present disclosure, the transmitted indication 215 (e.g., UE_buf_capability_DC and/or UE_buf_capability) may be a multiplier to equations (1), (2) and (3) described herein. In some examples, the multiplier may be less than or greater than one. For example, upon receiving the indication of the size capability for a layer two buffer at the UE 115-a, the base station may calculate a total layer two buffer size in dual-connectivity mode as a maximum value of the calculated values based on the following equations ((5) and (6)):

$$\text{UE\_buf\_capability\_DC} * [\text{MaxULDataRate\_MN} * \text{RLCRTT\_MN} + \text{MaxULDataRate\_SN} * \text{RLCRTT\_SN} + \text{MaxDLDataRate\_SN} * \text{RLCRTT\_SN} + \text{MaxDLDataRate\_MN} * (\text{RLCRTT\_SN} + X2/Xn \text{ delay} + \text{Queuing in SN})] \quad (5)$$

$$\text{UE\_buf\_capability\_DC} * [\text{MaxULDataRate\_MN} * \text{RLCRTT\_MN} + \text{MaxULDataRate\_SN} * \text{RLCRTT\_SN} + \text{MaxDLDataRate\_MN} * \text{RLCRTT\_MN} + \text{MaxDLDataRate\_SN} * (\text{RLCRTT\_MN} + X2/Xn \text{ delay} + \text{Queuing in MN})] \quad (6)$$

If the UE 115-a determines that the UE 115-a is not operating in a dual-connectivity mode and indicates UE_buf_capability, then a serving base station may determine a total layer two buffer size based on the following equation (7):

$$\text{UE\_buf\_capability} * [\text{MaxDLDataRate} * \text{RLC RTT} + \text{MaxULDataRate} * \text{RLC RTT}] \quad (7)$$

As described herein, the size of the layer two buffer may be calculated based on the following values:
X2/Xn delay+Queuing in SN=25 ms if SCG is NR, and 55 ms if SCG is E-UTRA
X2/Xn delay+Queuing in MN=25 ms if MCG is NR, and 55 ms if MCG is E-UTRA
RLC RTT for E-UTRA cell group=75 ms
RLC RTT for NR cell group is defined in Table 1, described herein.

In one example, the UE 115-a may receive downlink data 210 scheduled based on the transmitted indication 215. Additionally or alternatively, the base station may transmit scheduling information for uplink data transmission based on the indication 215, and the UE 115-a may transmit the uplink data according to the received scheduling information.

According to one or more aspects, the UE 115-a may identify a change of activity status of multiple subscriber identification modules of the UE 115-a. For example, the UE 115-a may include multiple subscriber identification modules, and may identify a change in status of at least one of the subscriber identification modules. In such an example, the UE 115-a may identify an updated size capability (e.g., an updated value of the parameters UE_buf_capability_DC and/or UE_buf_capability) based on identifying the change of the activity status, and may transmit a second indication of the updated size capability to the base station.

Additionally or alternatively, the UE 115-a may periodically measure one or more parameters (e.g., connectivity mode, number of modems, etc.) associated with the UE 115-a. In some cases, the UE 115-a may identify an updated size capability (e.g., an updated value of the parameters UE_buf_capability_DC and/or UE_buf_capability) based on the identifying periodically measuring the one or more parameters. The UE 115-a may then transmit a second indication of the updated size capability to the base station. In some example, the indication of the identified size capability may be a first multiplier, and the second indication of the updated size capability may be a second multiplier different from the first multiplier. In one example, the first indication may have a first value of "i" and the second indication may have a second value of "i," as depicted in equation (4). For instance, the UE 115-a may determine that the UE 115-a may support a smaller layer two buffer size based on measuring the one or more parameters. In such an example, the second indication may be associated with a smaller value of "i" and the first indication may be associated with a higher value of "i."

Figure 3:
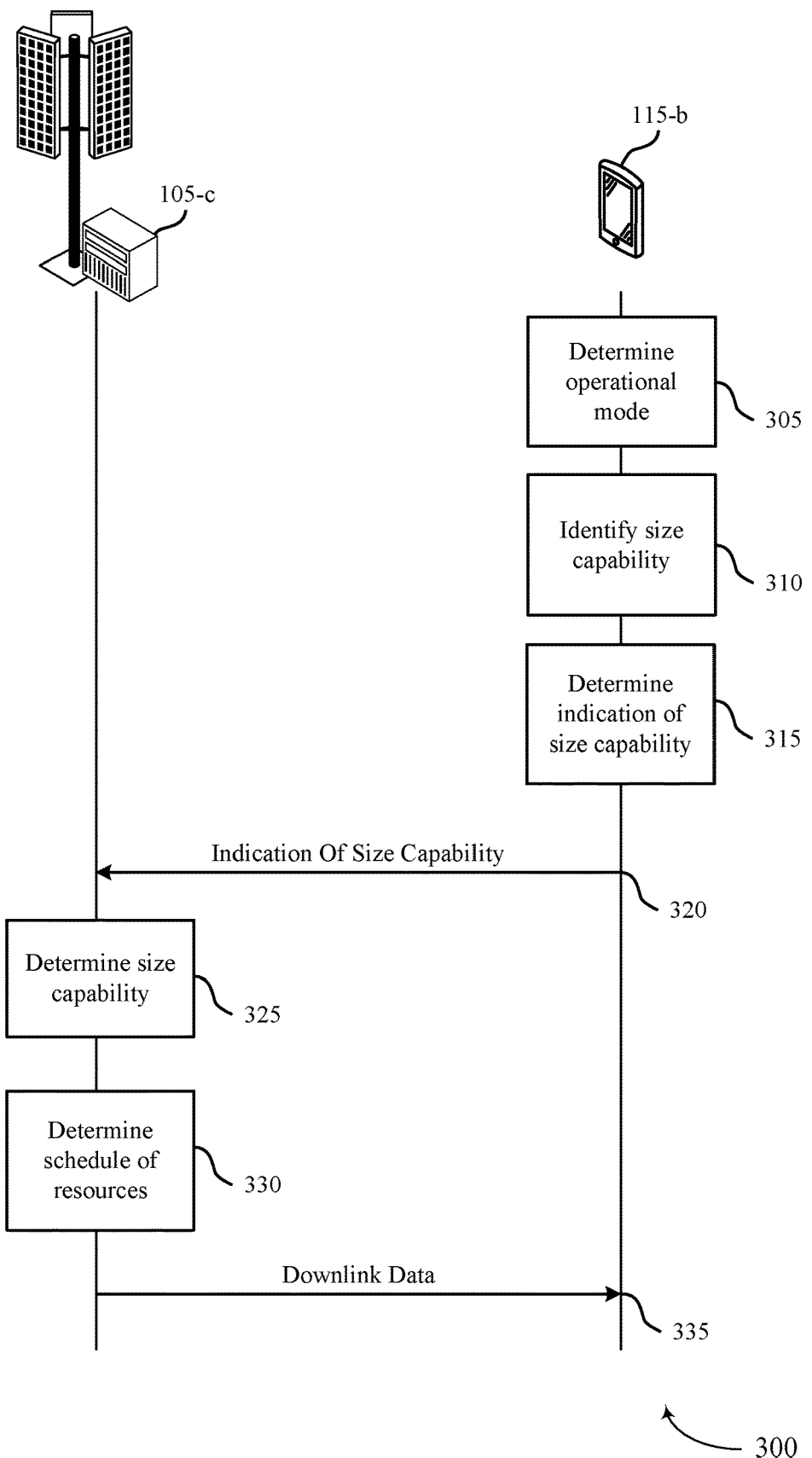
FIG. 3 illustrates an example of a process flow that supports signaling buffer size capability in accordance with aspects of the present disclosure.

FIG. 3 illustrates an example of a process flow 300 that supports signaling buffer size capability in accordance with aspects of the present disclosure. In some examples, the process flow 300 may implement aspects of the wireless communications system 100 and 200 described with reference to FIGS. 1 and 2, respectively. For example, the process flow 300 may be based on a capability signaling from a UE 115-b to a base station 105-b, for reduced power consumption, and may promote low latency for wireless communications, among other benefits. The base station 105-c and the UE 115-b may be examples of a base station 105 and a UE 115, as described with reference to FIGS. 1 and 2.

In the following description of the process flow 300, the operations between the base station 105-c and the UE 115-b may be transmitted in a different order than the example order shown, or the operations performed by the base station 105-c and the UE 115-b may be performed in different orders or at different times. Some operations may also be omitted from the process flow 300, and other operations may be added to the process flow 300.

At 305, the UE 115-b may determine an operational mode of the UE 115-b. In some examples, the UE 115-b may determine that the UE 115-b is configured to operate in a dual-connectivity mode. In some cases, the dual-connectivity mode may include at least one of a multi-radio dual-connectivity mode, an NR dual-connectivity mode, LTE dual-connectivity mode, or a combination thereof. In an alternative example, the UE 115-b may determine that the UE 115-b is configured to operate in a standalone mode.

At 310, the UE 115-b may identify a size capability for a buffer associated with a protocol layer of the UE 115-b. In some examples, the buffer is a layer two buffer and the protocol layer is a layer two protocol layer, where the protocol layer is above a physical layer and below a radio resource control layer. In some examples, the protocol layer is associated with one or more of a packet data convergence control layer, or an RLC layer, or a MAC layer. The layer two buffer may be associated with a transmit operation, or a receive operation, or a combination thereof. In some cases, the size capability may be pre-configured at the UE 115-b. In some cases, the UE 115-b may determine the size capability based on the operational mode of the UE 115-b.

At 315, the UE 115-b may determine an indication of the size capability of the buffer. In one example, the indication of the size capability may be a UE capability indication (e.g., parameters UE_buf_capability_DC and/or UE_buf_capability) as described with reference to FIG. 2.

At 320, the UE 115-b may transmit, to a base station 105-c serving the UE 115-b, the indication of the identified size capability for the buffer. For example, the UE 115-b may transmit the indication of the identified size capability in a UE capability report in radio resource control signaling. Although not depicted in FIG. 3, the base station 105-c may forward the UE capability report. For example, the base station 105-c may forward the UE capability report to another node of the radio access network or to a core network. Alternatively, the UE 115-b may transmit the indication of the identified size capability in a MAC control element.

At 325, the base station 105-c may determine the size capability for the buffer of the UE based on the received indication (e.g., by using equations (5), (6) and (7) as described with reference to FIG. 2). In some example, the base station 105-c may determine the size capability for the buffer based on the received indication, a size of un-acknowledged data for an uplink communication, an estimate of a size of a reordering buffer for downlink communication based on a state of at least one RLC, or a combination thereof.

At 330, the base station 105-c may determine a schedule of resources to use to transmit data to the UE 115-b. In some examples, the schedule of resources may be based on the determined size capability for the buffer. At 335, the base station 105-c may transmit, to the UE 115-b, downlink data scheduled based on the determined indication.

The operations performed by the base station 105-c and the UE 115-b as part of, but not limited to, process flow 300 may provide improvements to layer two buffer size determination by UE capability report transmission. Further, the operations performed by the base station 105-c and the UE 115-b as part of, but not limited to, process flow 300 may provide benefits and enhancements to the operation of the UE 115-b. For example, the described UE capability report transmission operations in the process flow 300 may support reduced power consumption, increased efficiency, among other advantages.

Figure 4:
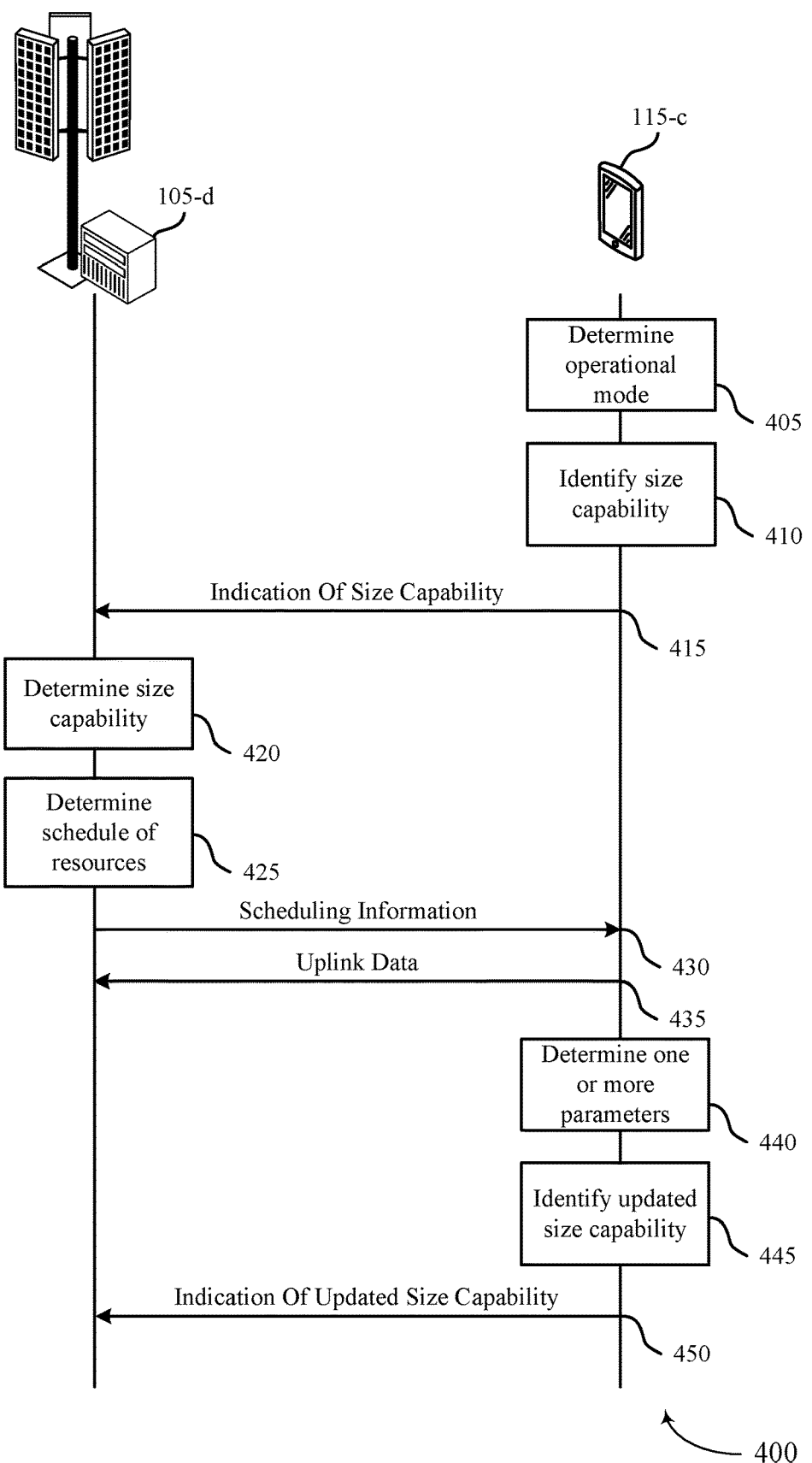
FIG. 4 illustrates an example of a process flow that supports signaling buffer size capability in accordance with aspects of the present disclosure.

FIG. 4 illustrates an example of a process flow 400 that supports signaling buffer size capability in accordance with aspects of the present disclosure. In some examples, the process flow 400 may implement aspects of the wireless communications system 100 and 200 described with reference to FIGS. 1 and 2, respectively. For example, the process flow 400 may be based on a capability signaling procedure between a UE 115-c and a base station 105-d. The process flow 400 may be implemented by the UE 115-c and the base station 105-d for reduced power consumption, and may promote low latency for wireless communications, among other benefits. The base station 105-d and the UE 115-c may be examples of a base station 105 and a UE 115, as described with reference to FIGS. 1 and 2.

In the following description of the process flow 400, the operations between the base station 105-d and the UE 115-c may be transmitted in a different order than the example order shown, or the operations performed by the base station 105-d and the UE 115-c may be performed in different orders or at different times. Some operations may also be omitted from the process flow 400, and other operations may be added to the process flow 400.

At 405, the UE 115-c may determine an operational mode of the UE 115-c. In some examples, the UE 115-c may determine that the UE 115-c is configured to operate in a dual-connectivity mode. Alternatively, the UE 115-c may determine that the UE 115-c is configured to operate in a standalone mode.

At 410, the UE 115-c may identify a size capability for a buffer associated with a protocol layer of the UE 115-c. In some examples, the buffer is a layer two buffer and the protocol layer is a layer two protocol layer, where the protocol layer is above a physical layer and below a radio resource control layer. In some cases, the size capability may be pre-configured at the UE 115-c. In some cases, the UE 115-c may determine the size capability based on the operational mode of the UE 115-c.

At 415, the UE 115-c may transmit, to a base station 105-d serving the UE 115-c, an indication (e.g., an indication including parameters UE_buf_capability_DC and/or UE_buf_capability) of the identified size capability for the buffer. For example, the UE 115-c may transmit the indication of the identified size capability in a UE capability report in radio resource control signaling. In some examples, the UE 115-c may transmit the indication of the identified size capability in a MAC control element.

At 420, the base station 105-d may determine the size capability for the buffer of the UE 115-c based on the received indication (e.g., by using equations (5), (6) and (7) as described with reference to FIG. 2). At 425, the base station 105-d may determine a schedule of resources to use to transmit data to the UE 115-d. In some examples, the schedule of resources may be based on the determined size capability for the buffer.

At 430, the base station 105-d may transmit, to the UE 115-c, scheduling information for uplink data transmission based on the indication transmitted by the UE 115-c. At 435, the UE 115-c may transmit the uplink data according to the received scheduling information.

At 440, the UE 115-c may determine one or more parameters. For example, the UE 115-c may identify a change of activity status of a set of subscriber identification modules of the UE 115-c. At 445, the UE 115-c may identify an updated size capability for the buffer based on determine the one or more parameters. At 450, the UE 115-*c* may transmit, to the base station 105-*d*, a second indication of the updated size capability for the buffer.

The operations performed by the base station 105-*d* and the UE 115-*c* as part of, but not limited to, process flow 400 may provide improvements to layer two buffer size determination based on UE capability report transmission. Further, the operations performed by the base station 105-*d* and the UE 115-*c* as part of, but not limited to, process flow 400 may provide benefits and enhancements to the operation of the UE 115-*c*. For example, the described UE capability report transmission operations in the process flow 400 may support reduced power consumption, increased efficiency, among other advantages.

Figure 5:
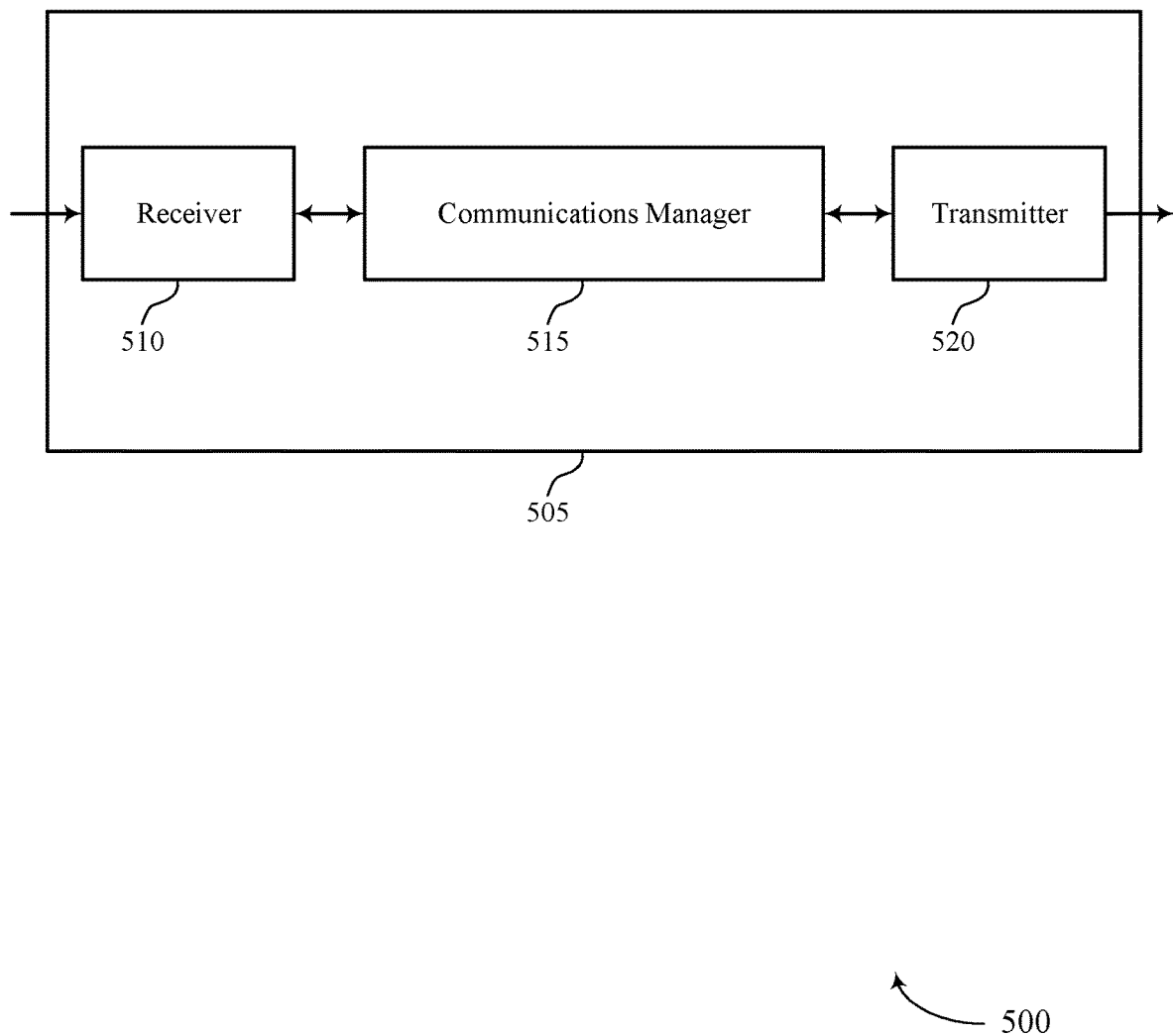
FIGS. 5 and 6 show block diagrams of devices that support signaling buffer size capability in accordance with aspects of the present disclosure.

FIG. 5 shows a block diagram 500 of a device 505 that supports signaling buffer size capability in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to signaling buffer size capability, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a size capability for a buffer associated with a protocol layer of the UE, transmit, to a base station serving the UE, an indication of the identified size capability for the buffer, and communicate, with the base station, data that is scheduled based on the transmitted indication. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
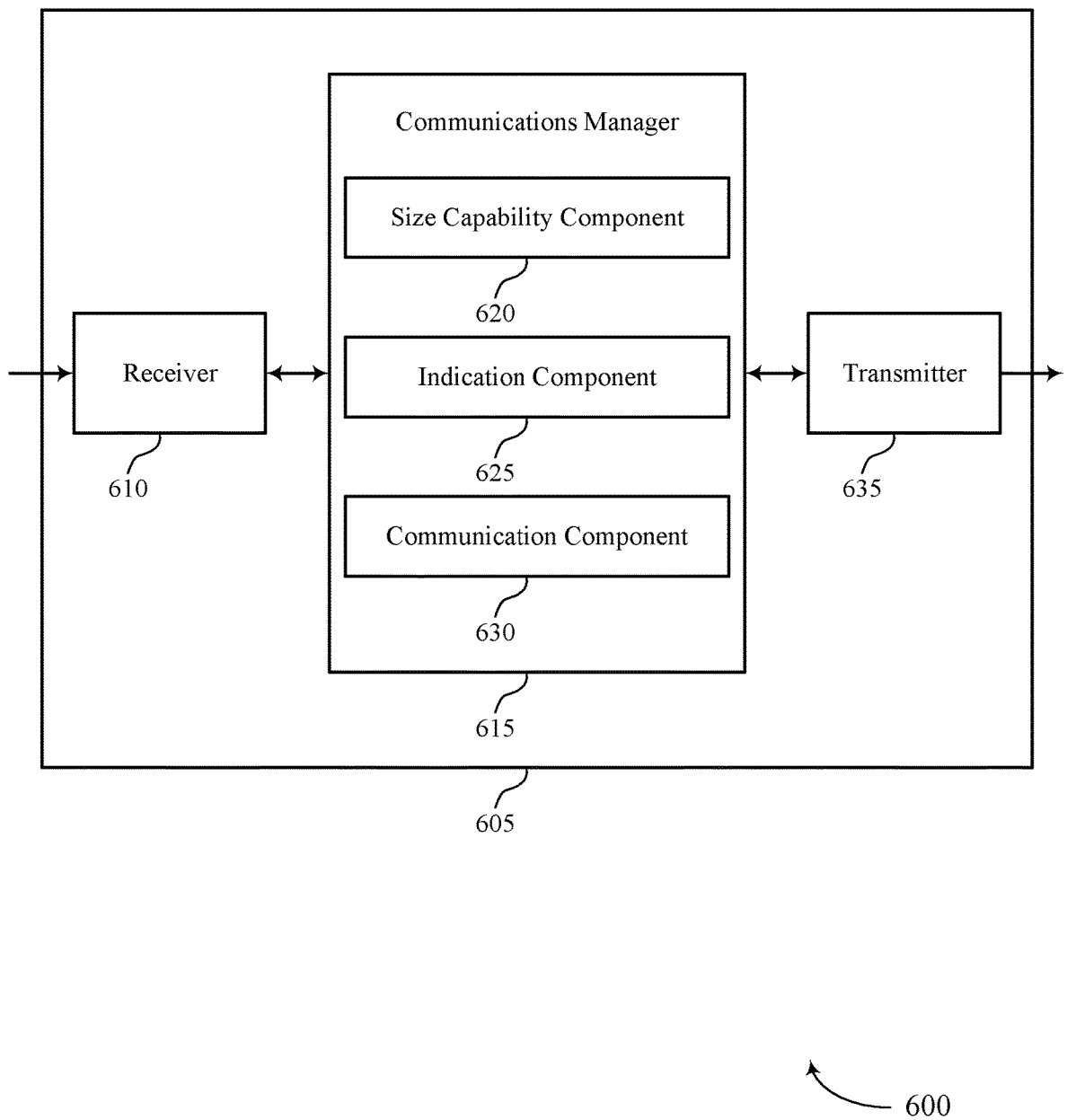

FIG. 6 shows a block diagram 600 of a device 605 that supports signaling buffer size capability in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to signaling buffer size capability, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a size capability component 620, an indication component 625, and a communication component 630. The communications manager 615 may be an example of aspects of the communications manager 810 described herein.

The size capability component 620 may identify a size capability for a buffer associated with a protocol layer of the UE. The indication component 625 may transmit, to a base station serving the UE, an indication of the identified size capability for the buffer. The communication component 630 may communicate, with the base station, data that is scheduled based on the transmitted indication.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
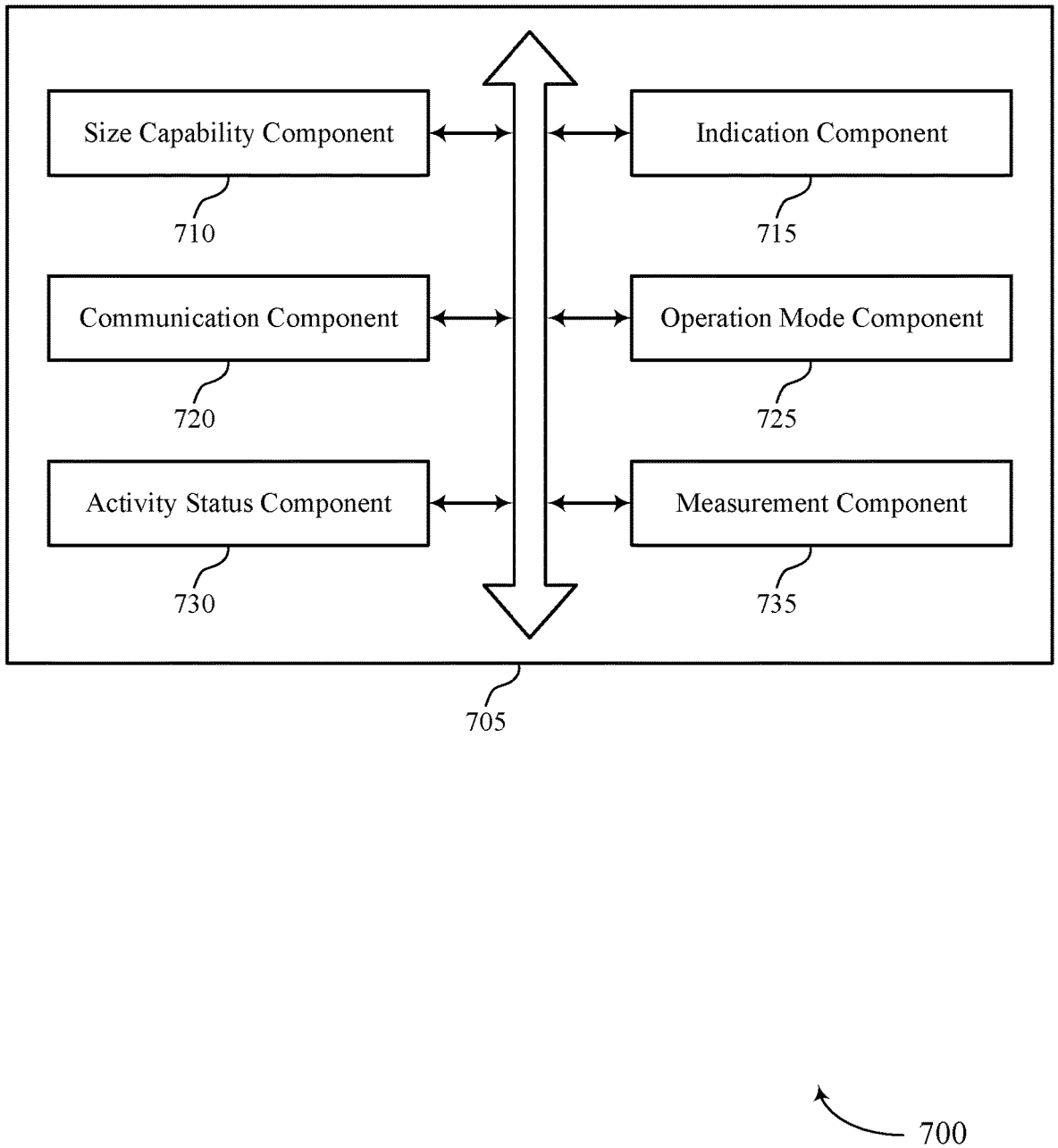
FIG. 7 shows a block diagram of a communications manager that supports signaling buffer size capability in accordance with aspects of the present disclosure.

FIG. 7 shows a block diagram 700 of a communications manager 705 that supports signaling buffer size capability in accordance with aspects of the present disclosure. The communications manager 705 may be an example of aspects of a communications manager 515, a communications manager 615, or a communications manager 810 described herein. The communications manager 705 may include a size capability component 710, an indication component 715, a communication component 720, an operation mode component 725, an activity status component 730, and a measurement component 735. Each of these modules may communicate, directly or indirectly, with one another (e.g., via one or more buses).

The size capability component 710 may identify a size capability for a buffer associated with a protocol layer of the UE. In some cases, the size capability is pre-configured at the UE. In some cases, the buffer is a layer two buffer and the protocol layer is a layer two protocol layer. In some cases, the protocol layer is above a physical layer and below a radio resource control layer. In some cases, the protocol layer is associated with one or more of a packet data convergence control layer, or an RLC layer, or a MAC layer. In some cases, the buffer is associated with a transmit operation, or a receive operation, or a combination thereof.

The indication component 715 may transmit, to a base station serving the UE, an indication of the identified size capability for the buffer. The communication component 720 may communicate, with the base station, data that is scheduled based on the transmitted indication.

In some examples, the communication component 720 may receive, from the base station, downlink data scheduled based on the transmitted indication. In some examples, the communication component 720 may receive, from the base station, scheduling information for uplink data scheduled based on the transmitted indication. In some examples, the communication component 720 may transmit, to the base station, the uplink data according to the received scheduling information.

In some examples, the indication component 715 may transmit the indication of the identified size capability in a UE capability report in radio resource control signaling. In some examples, the indication component 715 may transmit the UE capability report to the base station. In some examples, the indication component 715 may transmit, to the base station serving the UE, the indication of the identified size capability in a MAC control element.

The operation mode component 725 may determine that the UE is configured to operate in a dual-connectivity mode, where identifying the size capability for the buffer is based on determining that the UE is configured to operate in the dual-connectivity mode. In some cases, the dual-connectivity mode includes at least one of a multi-radio dual-connectivity mode, an NR dual-connectivity mode, LTE dual-connectivity mode, or a combination thereof.

In some examples, the operation mode component 725 may determine that the UE is configured to operate in at least one of a standalone mode or a dual-connectivity mode, where a second size capability for the buffer is based on the determining that the UE is configured to operate in the standalone mode, and a third size capability for the buffer is based on determining that the UE is configured to operate in the dual-connectivity mode. In some examples, transmitting the indication of the identified size capability for the buffer includes transmitting an indication of the second size capability and the third size capability.

In some examples, the operation mode component 725 may determine that the UE is configured to operate in a standalone mode. In some examples, the size capability component 710 may identify a second size capability for the buffer based on the determining that the UE is configured to operate in the standalone mode. In some examples, the indication component 715 may transmit, to the base station serving the UE, a second indication of the second size capability for the buffer.

The activity status component 730 may identify a change of activity status of a set of subscriber identification modules of the UE. In some examples, the activity status component 730 may identify the change of activity status of at least one of a set of subscriber identification modules of the UE, a sidelink communication, a position of the UE, or a combination thereof, the updated size capability for the buffer is identified based on the identifying the change of the activity status. In some examples, the size capability component 710 may identify an updated size capability for the buffer based on the identifying the change of the activity status. In some examples, the indication component 715 may transmit, to the base station serving the UE, a second indication of the updated size capability for the buffer The measurement component 735 may periodically measure one or more parameters associated with the UE. In some examples, the size capability component 710 may identify an updated size capability for the buffer based on the periodically measuring the one or more parameters. In some examples, the indication component 715 may transmit, to the base station serving the UE, a second indication of the updated size capability for the buffer. In some cases, the indication of the identified size capability is a first multiplier, and the second indication of the updated size capability is a second multiplier different from the first multiplier.

Figure 8:
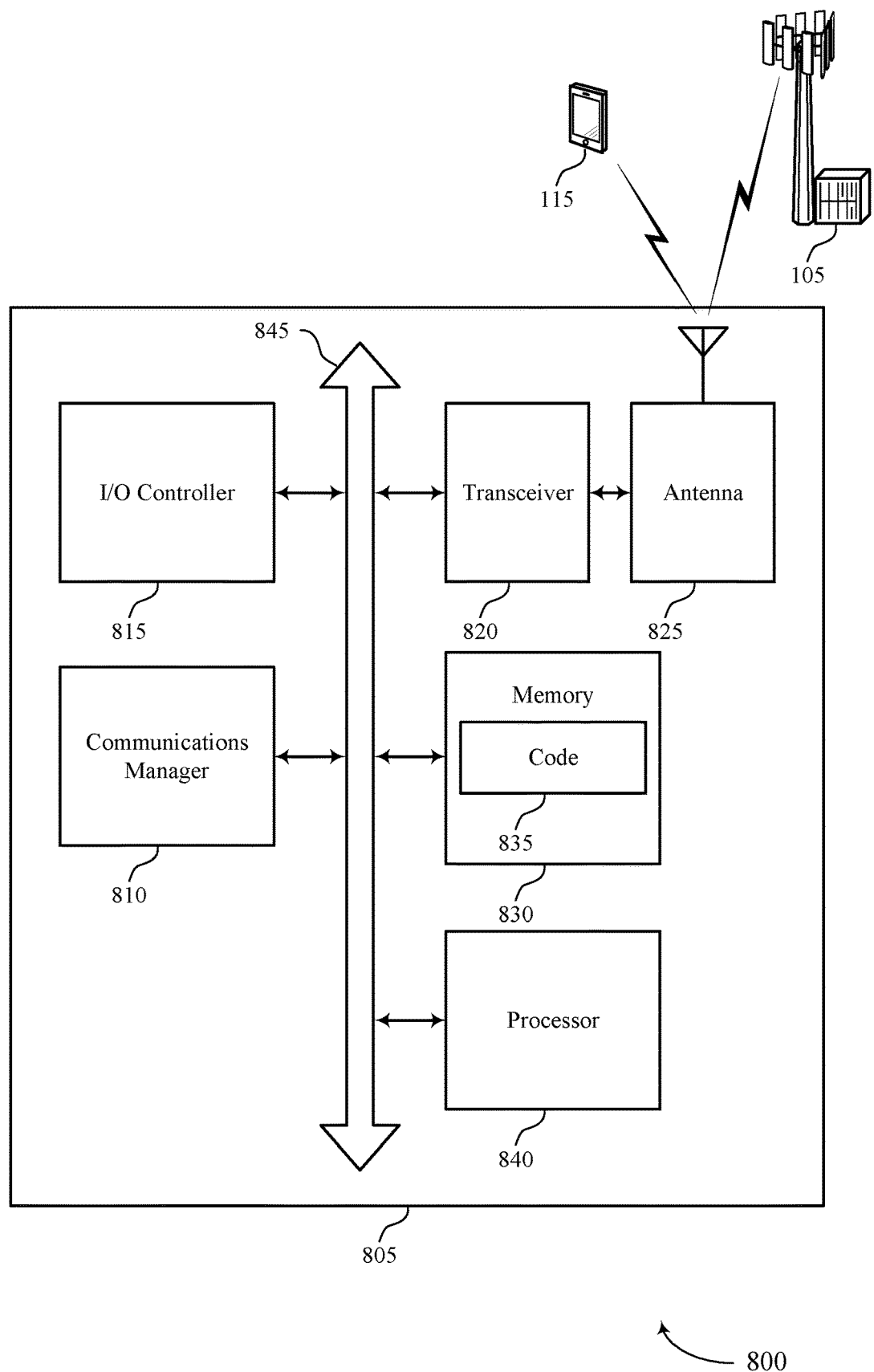
FIG. 8 shows a diagram of a system including a device that supports signaling buffer size capability in accordance with aspects of the present disclosure.

FIG. 8 shows a diagram of a system 800 including a device 805 that supports signaling buffer size capability in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a size capability for a buffer associated with a protocol layer of the UE, transmit, to a base station serving the UE, an indication of the identified size capability for the buffer, and communicate, with the base station, data that is scheduled based on the transmitted indication.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling buffer size capability).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
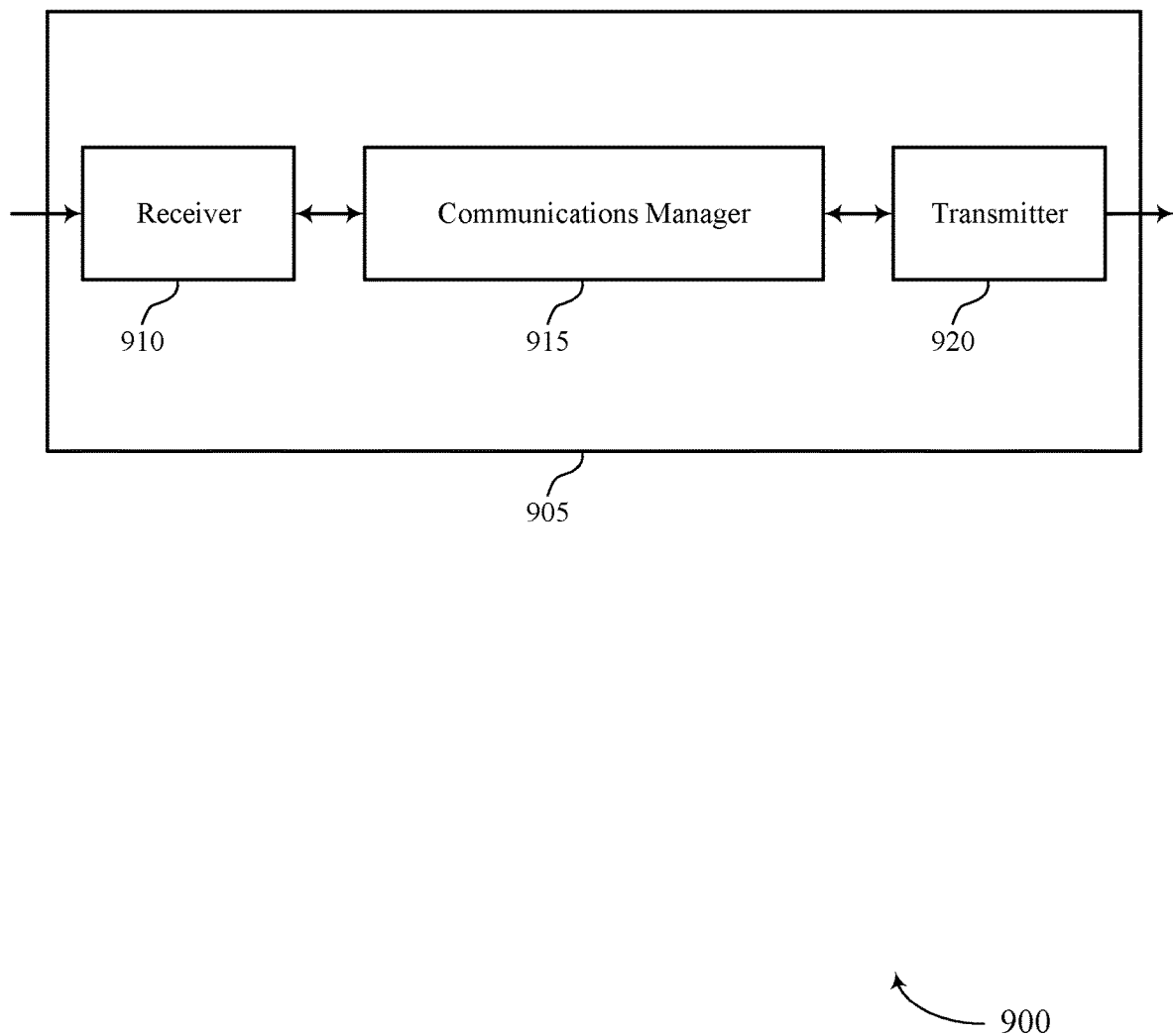
FIGS. 9 and 10 show block diagrams of devices that support signaling buffer size capability in accordance with aspects of the present disclosure.

FIG. 9 shows a block diagram 900 of a device 905 that supports signaling buffer size capability in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to signaling buffer size capability, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, an indication of a size capability for a buffer associated with a protocol layer of the UE, determine the size capability for the buffer of the UE based on the received indication, determine, based on the determined size capability for the buffer, a schedule of resources to use to transmit data to the UE, and communicate, with the UE, the data according to the determined schedule. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
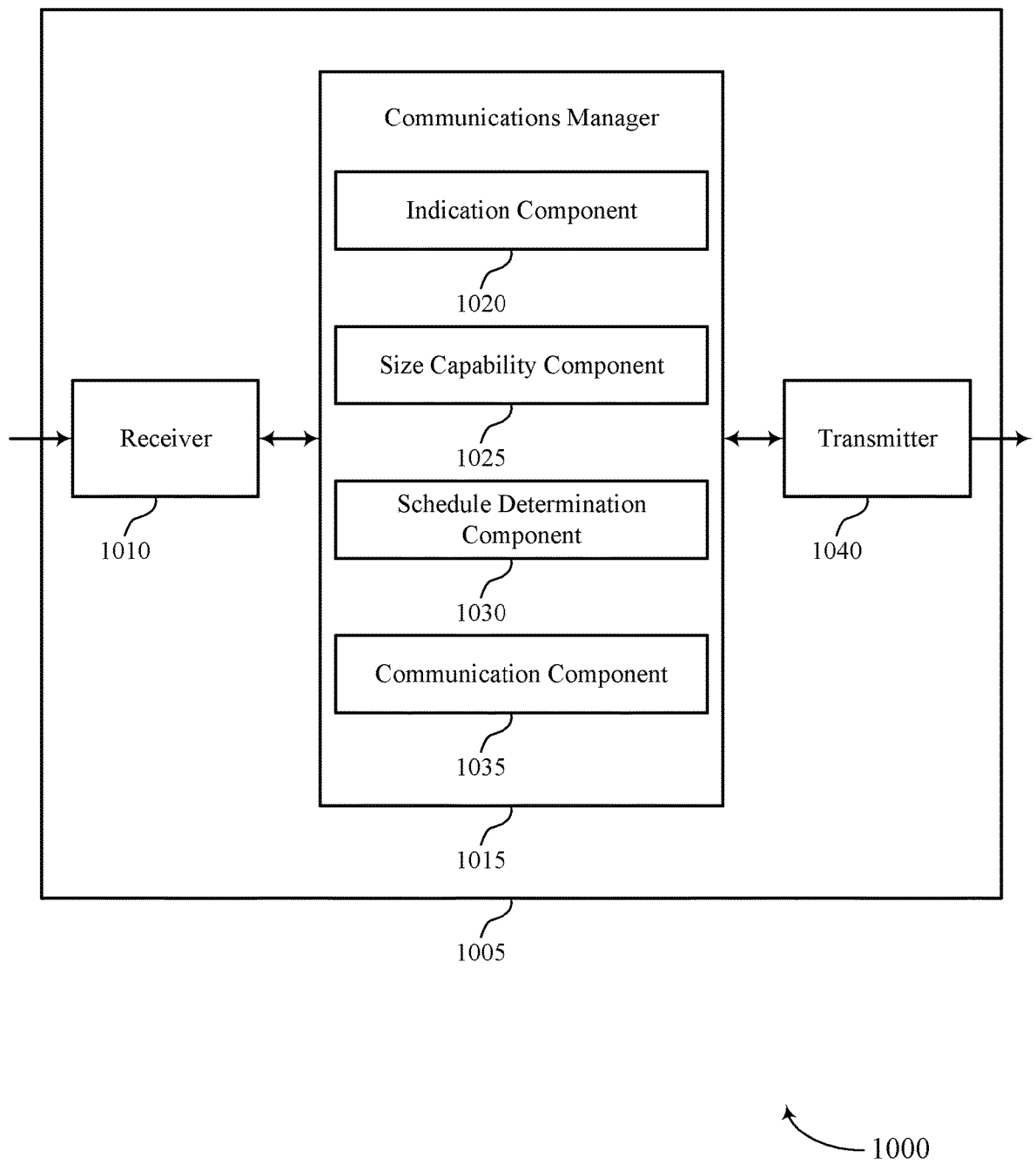

FIG. 10 shows a block diagram 1000 of a device 1005 that supports signaling buffer size capability in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling buffer size capability, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an indication component 1020, a size capability component 1025, a schedule determination component 1030, and a communication component 1035. The communications manager 1015 may be an example of aspects of the communications manager 1210 described herein.

The indication component 1020 may receive, from a UE, an indication of a size capability for a buffer associated with a protocol layer of the UE. The size capability component 1025 may determine the size capability for the buffer of the UE based on the received indication. The schedule determination component 1030 may determine, based on the determined size capability for the buffer, a schedule of resources to use to transmit data to the UE. The communication component 1035 may communicate, with the UE, the data according to the determined schedule.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
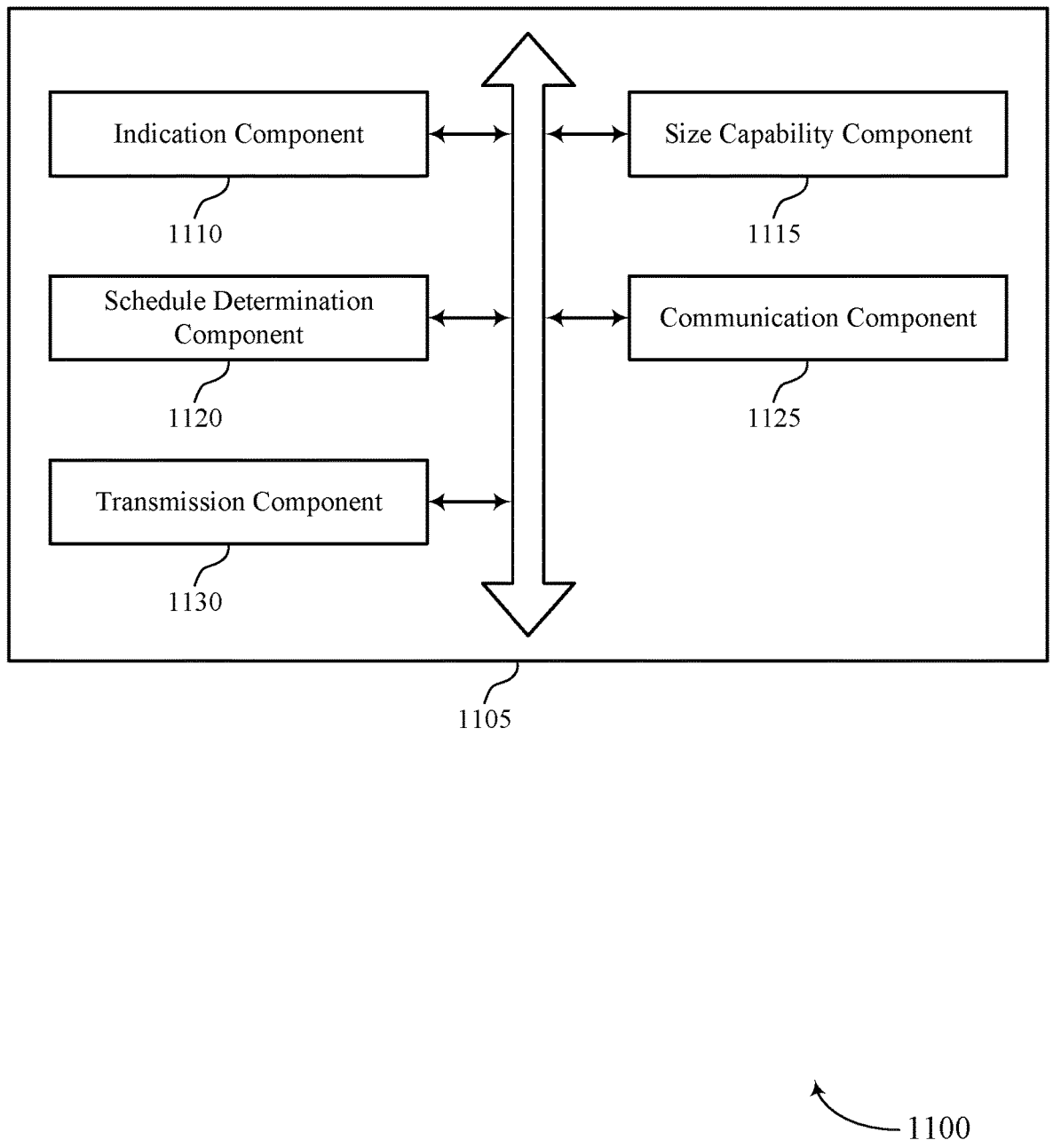
FIG. 11 shows a block diagram of a communications manager that supports signaling buffer size capability in accordance with aspects of the present disclosure.

FIG. 11 shows a block diagram 1100 of a communications manager 1105 that supports signaling buffer size capability in accordance with aspects of the present disclosure. The communications manager 1105 may be an example of aspects of a communications manager 915, a communications manager 1015, or a communications manager 1210 described herein. The communications manager 1105 may include an indication component 1110, a size capability component 1115, a schedule determination component 1120, a communication component 1125, and a transmission component 1130. Each of these modules may communicate, directly or indirectly, with one another (e.g., via one or more buses).

The indication component 1110 may receive, from a UE, an indication of a size capability for a buffer associated with a protocol layer of the UE. In some cases, the buffer is a layer two buffer and the protocol layer is a layer two protocol layer. In some cases, the protocol layer is above a physical layer and below a radio resource control layer. In some cases, the protocol layer is associated with one or more of a packet data convergence control layer, or an RLC layer, or a MAC layer. In some cases, the buffer is associated with a transmit operation or a receive operation or both.

The size capability component 1115 may determine the size capability for the buffer of the UE based on the received indication. In some cases, the size capability is pre-configured at the UE. The schedule determination component 1120 may determine, based on the determined size capability for the buffer, a schedule of resources to use to transmit data to the UE. The communication component 1125 may communicate, with the UE, the data according to the determined schedule.

In some examples, the communication component 1125 may transmit, to the UE, downlink data scheduled based on the received indication. In some examples, the communication component 1125 may transmit, to the UE, scheduling information for uplink data transmission by the UE based on the received indication. In some examples, the communication component 1125 may receive, from the UE, the uplink data according to the transmitted scheduling information.

In some examples, the size capability component 1115 may determine the size capability for the buffer based on the received indication, a size of un-acknowledged data for an uplink communication, an estimate of a size of a reordering buffer for downlink communication based on a state of at least one radio link control, or a combination thereof.

In some examples, the indication component 1110 may receive, from the UE, the indication of the size capability in a UE capability report in a radio resource control signaling. The transmission component 1130 may transmit the UE capability report. In some examples, the indication component 1110 may receive, from the UE, the indication of the size capability in a MAC control element.

In some cases, the indication of the size capability for the buffer is based on the UE operating in a dual-connectivity mode. In some cases, the dual-connectivity mode includes at least one of a multi-radio dual-connectivity mode, a new radio dual-connectivity mode, LTE dual-connectivity mode, or a combination thereof. In some cases, the indication of the size capability for the buffer is based on the UE operating in a standalone mode.

In some examples, the indication component 1110 may receive, from the UE, a second indication of a second size capability for the buffer and a third indication of a third size capability for the buffer, where the second size capability for the buffer is based on the UE operating in the standalone mode, and the third size capability for the buffer is based on the UE operating in the dual-connectivity mode. In some examples, the size capability component 1115 may determine the second size capability for the buffer based on the second indication and the third size capability for the buffer based on the third indication, where receiving the indication of the size capability for the buffer includes receiving the second indication and the third indication.

In some examples, the indication component 1110 may receive, from the UE, a second indication of an updated size capability for the buffer, where the second indication of the updated size capability for the buffer is based on a periodic measurement of one or more parameters at the UE. In some examples, the size capability component 1115 may determine the updated size capability for the buffer based on the second indication. In some cases, the indication of the identified size capability is a first multiplier, and the second indication of the updated size capability is a second multiplier different from the first multiplier.

In some examples, the indication component 1110 may receive, from the UE, a second indication of an updated size capability for the buffer, where the second indication of the updated size capability for the buffer is based on a change of activity status of a set of subscriber identification modules of the UE. In some examples, the size capability component 1115 may determine the updated size capability for the buffer based on the second indication.

Figure 12:
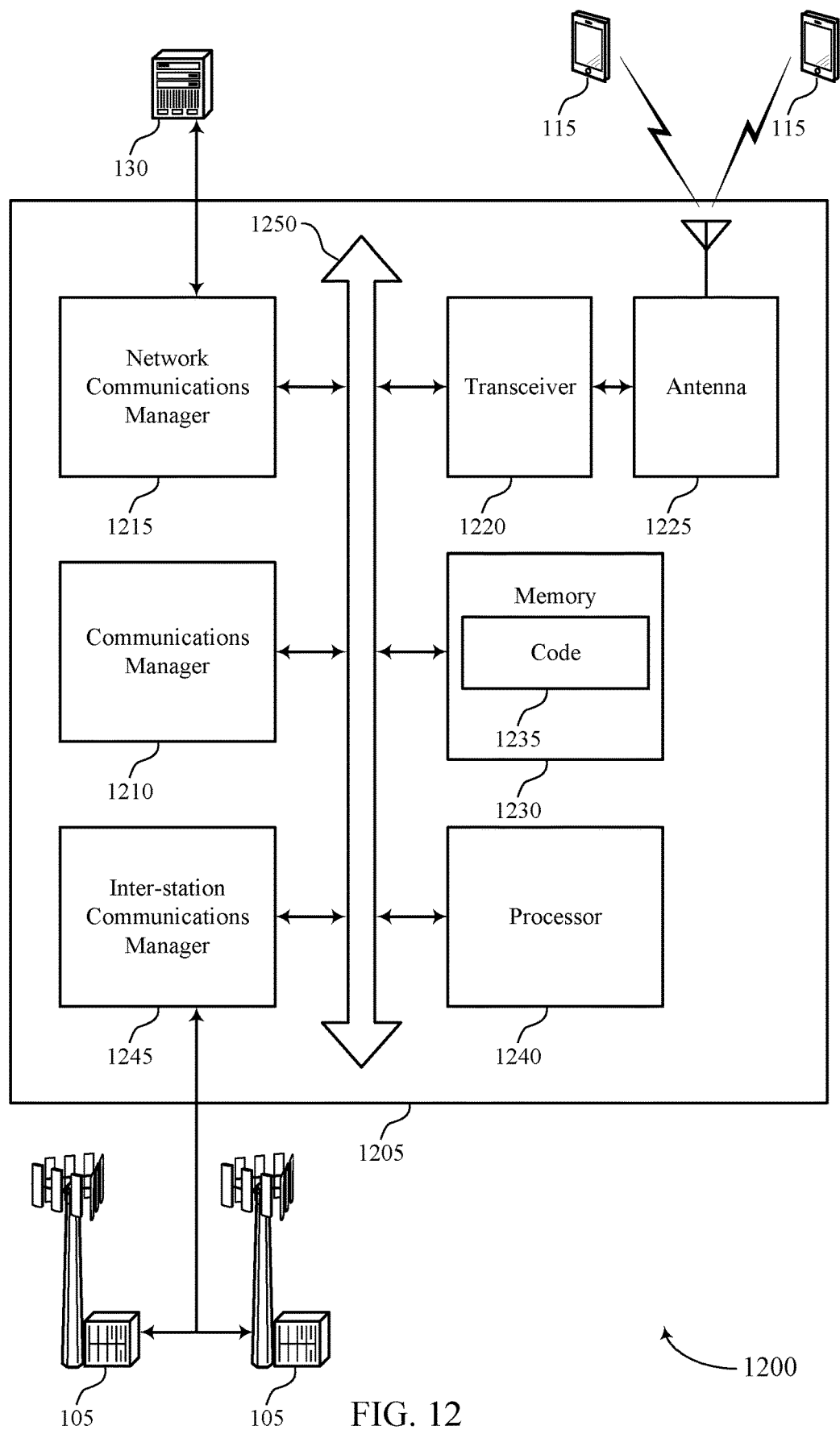
FIG. 12 shows a diagram of a system including a device that supports signaling buffer size capability in accordance with aspects of the present disclosure.

FIG. 12 shows a diagram of a system 1200 including a device 1205 that supports signaling buffer size capability in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, an indication of a size capability for a buffer associated with a protocol layer of the UE, determine the size capability for the buffer of the UE based on the received indication, determine, based on the determined size capability for the buffer, a schedule of resources to use to transmit data to the UE, and communicate, with the UE, the data according to the determined schedule.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting signaling buffer size capability).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
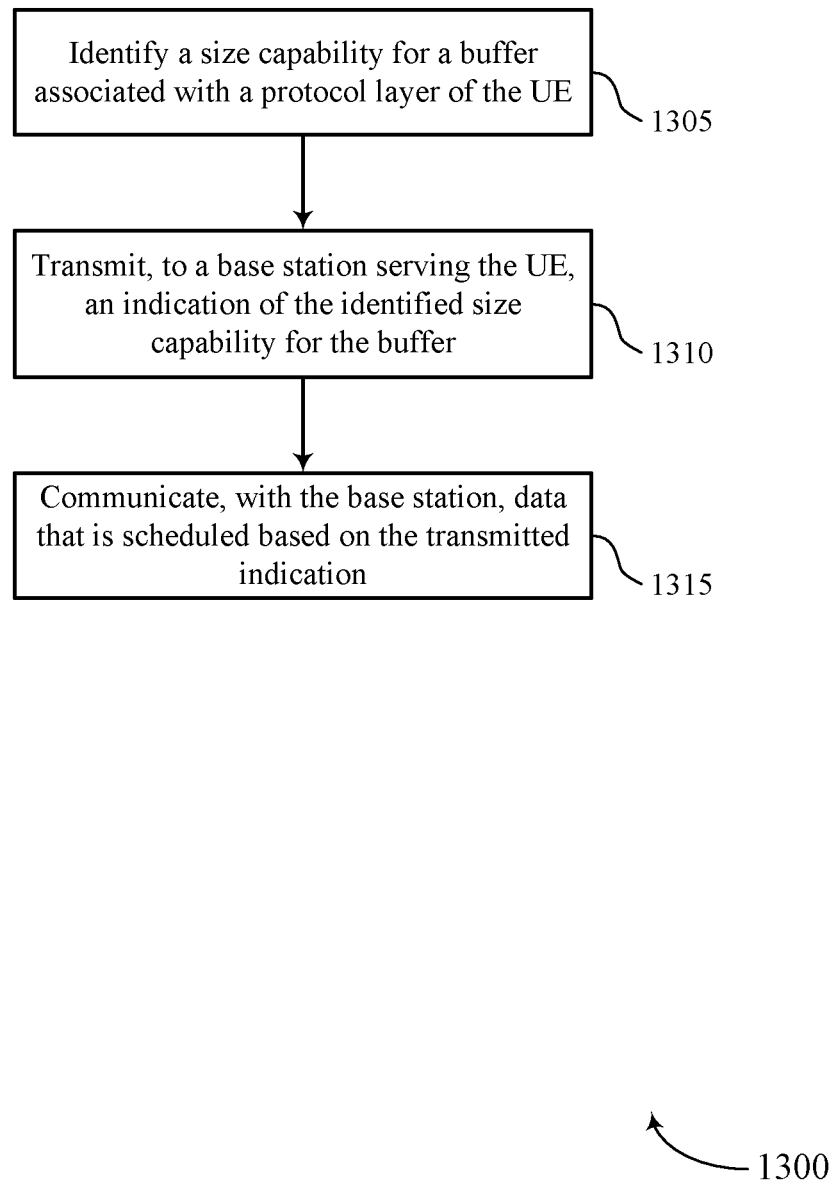
FIGS. 13 through 16 show flowcharts illustrating methods that support signaling buffer size capability in accordance with aspects of the present disclosure.

FIG. 13 shows a flowchart illustrating a method 1300 that supports signaling buffer size capability in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may identify a size capability for a buffer associated with a protocol layer of the UE. The operations of 1305 may be performed according to the methods described herein. In some examples, aspects of the operations of 1305 may be performed by a size capability component as described with reference to FIGS. 5 through 8.

At 1310, the UE may transmit, to a base station serving the UE, an indication of the identified size capability for the buffer. The operations of 1310 may be performed according to the methods described herein. In some examples, aspects of the operations of 1310 may be performed by an indication component as described with reference to FIGS. 5 through 8.

At 1315, the UE may communicate, with the base station, data that is scheduled based on the transmitted indication. The operations of 1315 may be performed according to the methods described herein. In some examples, aspects of the operations of 1315 may be performed by a communication component as described with reference to FIGS. 5 through 8.

Figure 14:
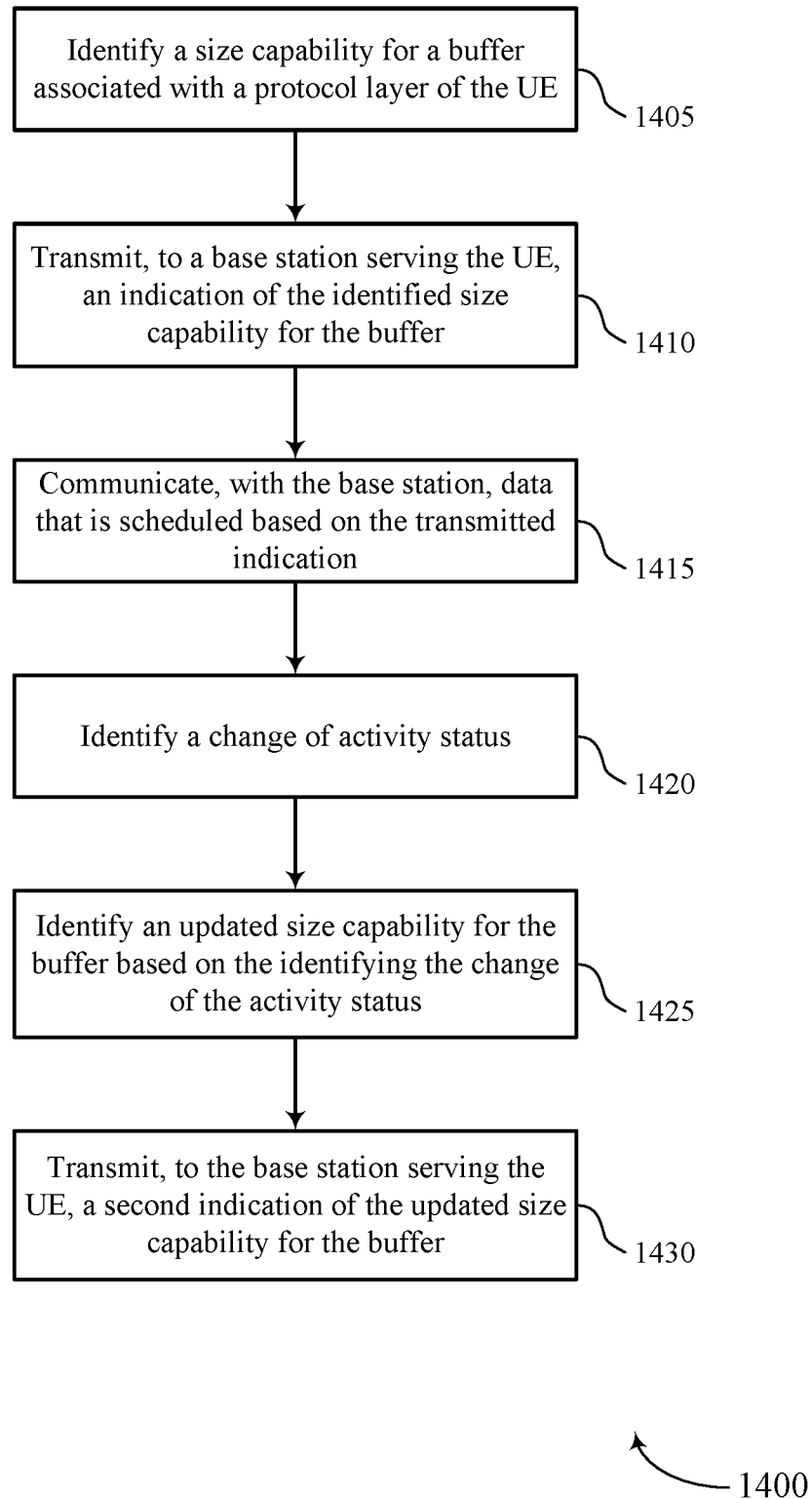

FIG. 14 shows a flowchart illustrating a method 1400 that supports signaling buffer size capability in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may identify a size capability for a buffer associated with a protocol layer of the UE. The operations of 1405 may be performed according to the methods described herein. In some examples, aspects of the operations of 1405 may be performed by a size capability component as described with reference to FIGS. 5 through 8.

At 1410, the UE may transmit, to a base station serving the UE, an indication of the identified size capability for the buffer. The operations of 1410 may be performed according to the methods described herein. In some examples, aspects of the operations of 1410 may be performed by an indication component as described with reference to FIGS. 5 through 8.

At 1415, the UE may communicate, with the base station, data that is scheduled based on the transmitted indication. The operations of 1415 may be performed according to the methods described herein. In some examples, aspects of the operations of 1415 may be performed by a communication component as described with reference to FIGS. 5 through 8.

At 1420, the UE may identify a change of activity status. In some examples, the UE may identify the change of activity status of at least one of a set of subscriber identification modules of the UE, a sidelink communication, a position of the UE, or a combination thereof. The operations of 1420 may be performed according to the methods described herein. In some examples, aspects of the operations of 1420 may be performed by an activity status component as described with reference to FIGS. 5 through 8.

At 1425, the UE may identify an updated size capability for the buffer based on the identifying the change of the activity status. The operations of 1425 may be performed according to the methods described herein. In some examples, aspects of the operations of 1425 may be performed by a size capability component as described with reference to FIGS. 5 through 8.

At 1430, the UE may transmit, to the base station serving the UE, a second indication of the updated size capability for the buffer. The operations of 1430 may be performed according to the methods described herein. In some examples, aspects of the operations of 1430 may be performed by an indication component as described with reference to FIGS. 5 through 8.

Figure 15:
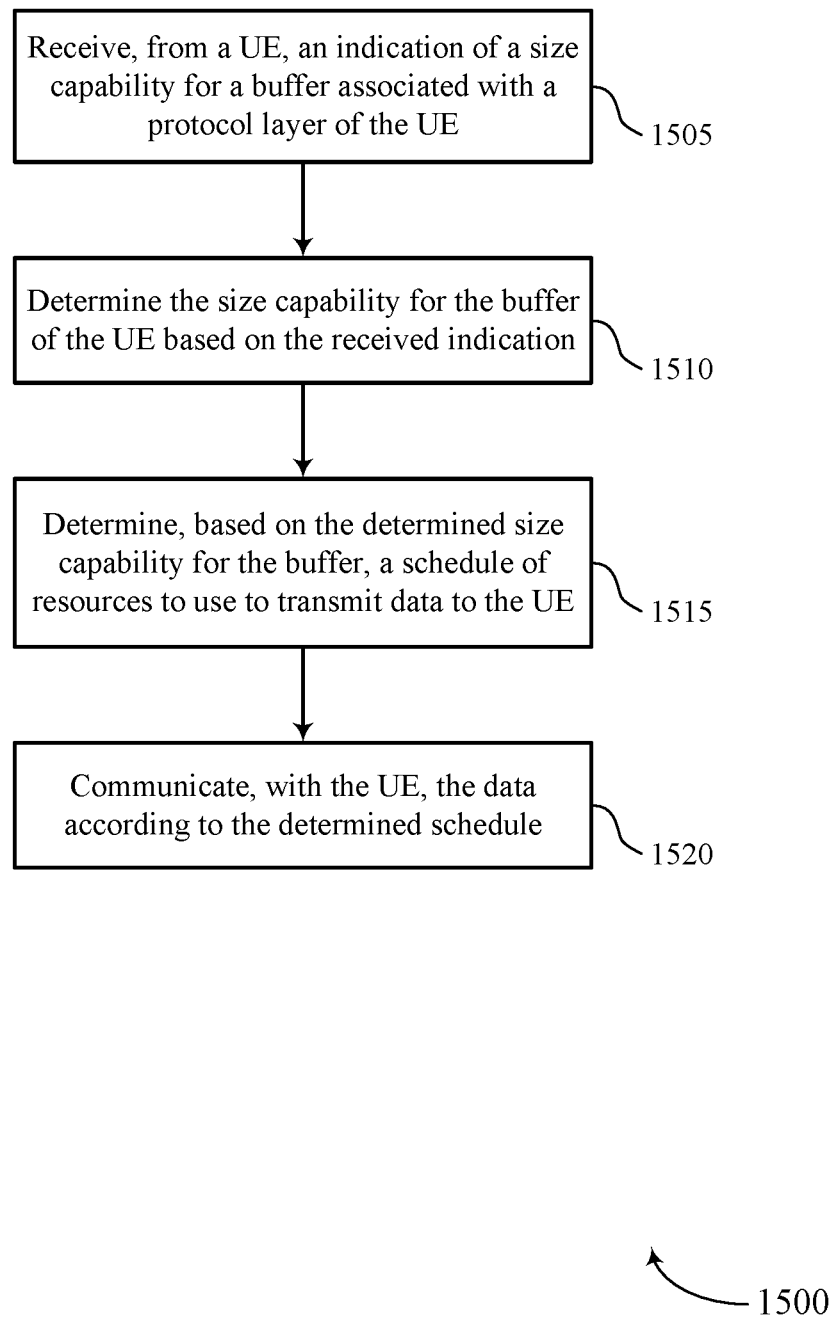

FIG. 15 shows a flowchart illustrating a method 1500 that supports signaling buffer size capability in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may receive, from a UE, an indication of a size capability for a buffer associated with a protocol layer of the UE. The operations of 1505 may be performed according to the methods described herein. In some examples, aspects of the operations of 1505 may be performed by an indication component as described with reference to FIGS. 9 through 12.

At 1510, the base station may determine the size capability for the buffer of the UE based on the received indication. The operations of 1510 may be performed according to the methods described herein. In some examples, aspects of the operations of 1510 may be performed by a size capability component as described with reference to FIGS. 9 through 12.

At 1515, the base station may determine, based on the determined size capability for the buffer, a schedule of resources to use to transmit data to the UE. The operations of 1515 may be performed according to the methods described herein. In some examples, aspects of the operations of 1515 may be performed by a schedule determination component as described with reference to FIGS. 9 through 12.

At 1520, the base station may communicate, with the UE, the data according to the determined schedule. The operations of 1520 may be performed according to the methods described herein. In some examples, aspects of the operations of 1520 may be performed by a communication component as described with reference to FIGS. 9 through 12.

Figure 16:
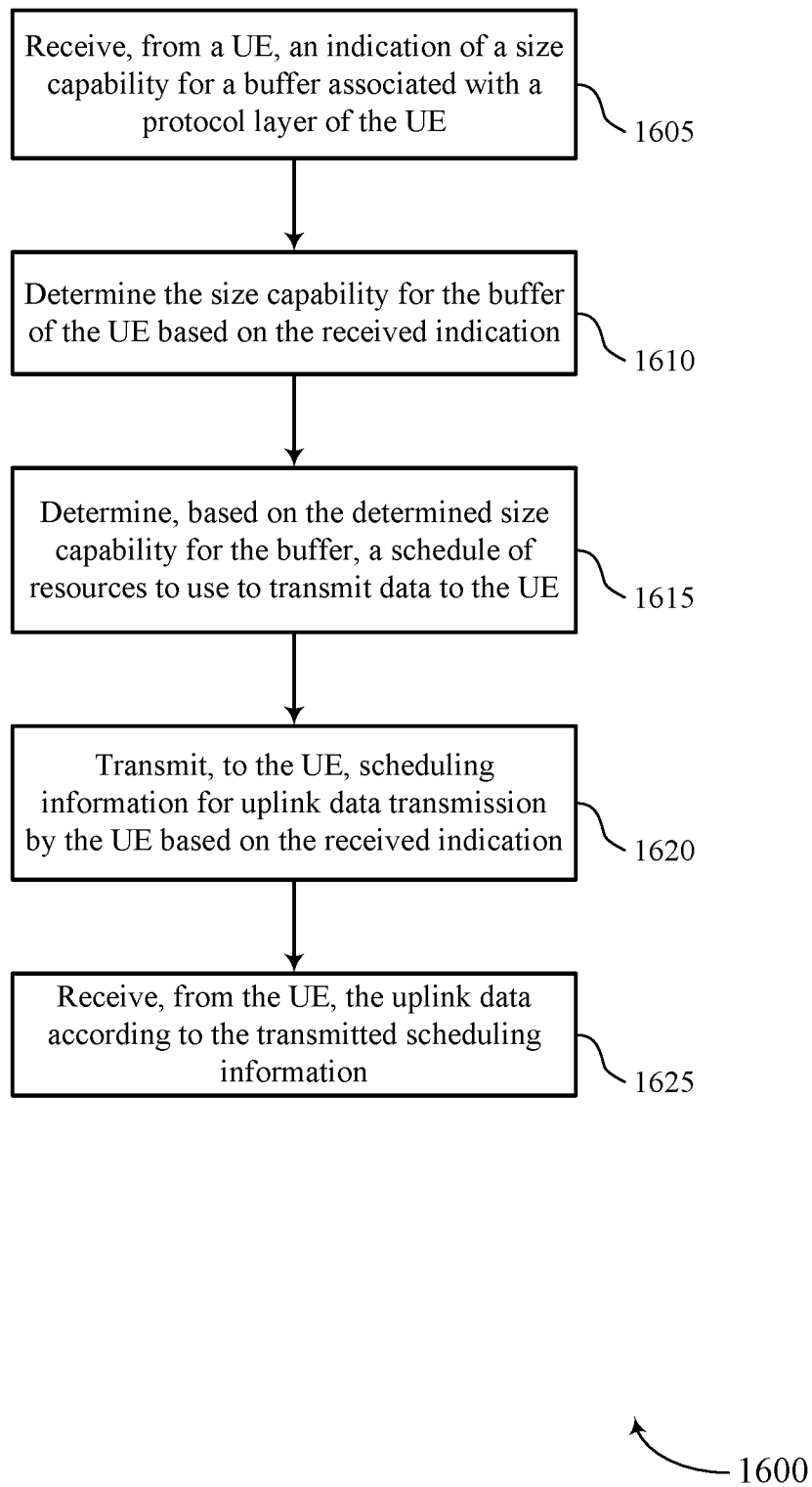

FIG. 16 shows a flowchart illustrating a method 1600 that supports signaling buffer size capability in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may receive, from a UE, an indication of a size capability for a buffer associated with a protocol layer of the UE. The operations of 1605 may be performed according to the methods described herein. In some examples, aspects of the operations of 1605 may be performed by an indication component as described with reference to FIGS. 9 through 12.

At 1610, the base station may determine the size capability for the buffer of the UE based on the received indication. The operations of 1610 may be performed according to the methods described herein. In some examples, aspects of the operations of 1610 may be performed by a size capability component as described with reference to FIGS. 9 through 12.

At 1615, the base station may determine, based on the determined size capability for the buffer, a schedule of resources to use to transmit data to the UE. The operations of 1615 may be performed according to the methods described herein. In some examples, aspects of the operations of 1615 may be performed by a schedule determination component as described with reference to FIGS. 9 through 12.

At 1620, the base station may transmit, to the UE, scheduling information for uplink data transmission by the UE based on the received indication. The operations of 1620 may be performed according to the methods described herein. In some examples, aspects of the operations of 1620 may be performed by a communication component as described with reference to FIGS. 9 through 12.

At 1625, the base station may receive, from the UE, the uplink data according to the transmitted scheduling information. The operations of 1625 may be performed according to the methods described herein. In some examples, aspects of the operations of 1625 may be performed by a communication component as described with reference to FIGS. 9 through 12.

The following provides an overview of aspects of the present disclosure:

Aspect 1: A method for wireless communication at a UE, comprising: identifying a size capability for a buffer associated with a protocol layer of the UE; transmitting, to a base station serving the UE, an indication of the identified size capability for the buffer; and communicating, with the base station, data that is scheduled based at least in part on the transmitted indication.

Aspect 2: The method of aspect 1, wherein the communicating comprises: receiving, from the base station, downlink data scheduled based at least in part on the transmitted indication.

Aspect 3: The method of any of aspects 1 through 2, wherein the communicating comprises: receiving, from the base station, scheduling information for uplink data scheduled based at least in part on the transmitted indication; and transmitting, to the base station, the uplink data according to the received scheduling information.

Aspect 4: The method of any of aspects 1 through 3, wherein transmitting the indication of the identified size capability comprises: transmitting the indication of the identified size capability in a UE capability report in radio resource control signaling.

Aspect 5: The method of aspect 4, wherein the transmitting comprises: transmitting the UE capability report to the base station.

Aspect 6: The method of aspect 4, wherein the UE transmits an indication of a preference of the UE associated with allocating the buffer between downlink communications and uplink communications.

Aspect 7: The method of any of aspects 1 through 5, wherein transmitting the indication of the identified size capability comprises: transmitting, to the base station serving the UE, the indication of the identified size capability in a medium access control (MAC) control element.

Aspect 8: The method of any of aspects 1 through 7, further comprising: determining that the UE is configured to operate in a dual-connectivity mode, wherein identifying the size capability for the buffer is based at least in part on determining that the UE is configured to operate in the dual-connectivity mode.

Aspect 9: The method of any of aspects 1 through 8, further comprising: determining that the UE is configured to operate in at least one of a standalone mode or a dual-connectivity mode, wherein a second size capability for the buffer is based at least in part on the determining that the UE is configured to operate in the standalone mode, and a third size capability for the buffer is based at least in part on determining that the UE is configured to operate in the dual-connectivity mode, wherein transmitting the indication of the identified size capability for the buffer comprises transmitting an indication of the second size capability and the third size capability.

Aspect 10: The method of any of aspects 1 through 9, further comprising: identifying an updated size capability for the buffer based at least in part on identifying a change of activity status of the UE; and transmitting, to the base station serving the UE, a second indication of the updated size capability for the buffer.

Aspect 11: The method of aspect 10, further comprising: identifying the change of activity status of at least one of a plurality of subscriber identification modules of the UE, a sidelink communication, a position of the UE, or a combination thereof, the updated size capability for the buffer is identified based at least in part on the identifying the change of the activity status.

Aspect 12: The method of any of aspects 1 through 11, further comprising: periodically measuring one or more parameters associated with the UE; identifying an updated size capability for the buffer based at least in part on the periodically measuring the one or more parameters; and transmitting, to the base station serving the UE, a second indication of the updated size capability for the buffer.

Aspect 13: A method for wireless communication at a network node, comprising: receiving, from a UE, an indication of a size capability for a buffer associated with a protocol layer of the UE; determining the size capability for the buffer of the UE based at least in part on the received indication; determining, based at least in part on the determined size capability for the buffer, a schedule of resources to use to transmit data to the UE; and communicating, with the UE, the data according to the determined schedule.

Aspect 14: The method of aspect 13, wherein the communicating comprises: transmitting, to the UE, downlink data scheduled based at least in part on the received indication.

Aspect 15: The method of any of aspects 13 through 14, wherein the communicating comprises: transmitting, to the UE, scheduling information for uplink data scheduled by the UE based at least in part on the received indication; and receiving, from the UE, the uplink data according to the transmitted scheduling information.

Aspect 16: The method of any of aspects 13 through 15, wherein determining the size capability comprises: determining the size capability for the buffer based at least in part on the received indication, a size of un-acknowledged data for an uplink communication, an estimate of a size of a reordering buffer for downlink communication based at least in part on a state of at least one radio link control, or a combination thereof.

Aspect 17: The method of any of aspects 13 through 16, wherein receiving the indication of the size capability comprises: receiving, from the UE, the indication of the size capability in a UE capability report in a radio resource control signaling.

Aspect 18: The method of aspect 17, wherein receiving the indication of the size capability comprises: receiving, from the UE, the indication of the size capability in a medium access control (MAC) control element.

Aspect 19: The method of any of aspects 13 through 18, wherein receiving the indication of the size capability comprises: receiving, from the UE, the indication of the size capability in a medium access control (MAC) control element.

Aspect 20: The method of any of aspects 13 through 19, wherein the indication of the size capability for the buffer is based at least in part on the UE operating in a dual-connectivity mode.

Aspect 21: The method of any of aspects 13 through 20, wherein the indication of the size capability for the buffer is based at least in part on the UE operating in a standalone mode.

Aspect 22: The method of any of aspects 13 through 21, further comprising: receiving, from the UE, a second indication of a second size capability for the buffer and a third indication of a third size capability for the buffer, wherein the second size capability for the buffer is based at least in part on the UE operating in the standalone mode, and the third size capability for the buffer is based at least in part on the UE operating in the dual-connectivity mode; and determining the second size capability for the buffer based at least in part on the second indication and the third size capability for the buffer based at least in part on the third indication, wherein receiving the indication of the size capability for the buffer comprises receiving the second indication and the third indication.

Aspect 23: The method of any of aspects 13 through 22, further comprising: receiving, from the UE, a second indication of an updated size capability for the buffer, wherein the second indication of the updated size capability for the buffer is based at least in part on a periodic measurement of one or more parameters at the UE; and determining the updated size capability for the buffer based at least in part on the second indication.

Aspect 24: The method of any of aspects 13 through 23, further comprising: receiving, from the UE, a second indication of an updated size capability for the buffer, wherein the second indication of the updated size capability for the buffer is based at least in part on a change of activity status of the UE; and determining the updated size capability for the buffer based at least in part on the second indication.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a network node, comprising a processor; memory coupled with the processor; and instructions stored in the memory and executable by the processor to cause the apparatus to perform a method of any of aspects 13 through 24.

Aspect 29: An apparatus for wireless communication at a network node, comprising at least one means for performing a method of any of aspects 13 through 24.

Aspect 30: A non-transitory computer-readable medium storing code for wireless communication at a network node, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3GPP." CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a first threshold size capability for a buffer of a protocol layer of the UE associated with a standalone mode and a second threshold size capability for the buffer of the protocol layer of the UE, different from the first threshold size capability, associated with a dual-connectivity mode;
   transmitting, to a network entity serving the UE, a first indication of the first threshold size capability and the second threshold size capability, and a second indication of a preference of the UE associated with allocating the buffer between downlink communications and uplink communications; and
   communicating, with the network entity, data that is scheduled based at least in part on the transmitted first indication, the second indication, or both.

2. The method of claim 1, wherein the communicating comprises:
   receiving, from the network entity, downlink data scheduled based at least in part on the transmitted first indication, second indication, or both.

3. The method of claim 1, wherein the communicating comprises:
   receiving, from the network entity, scheduling information for uplink data scheduled based at least in part on the transmitted first indication, second indication, or both; and
   transmitting, to the network entity, the uplink data according to the received scheduling information.

4. The method of claim 1, wherein transmitting the first indication of the first threshold size capability and the second threshold size capability comprises:
   transmitting the first indication of the first threshold size capability and the second threshold size capability in a UE capability report in radio resource control signaling, or in a medium access control (MAC) control element.

5. The method of claim 4,
   wherein the preference of the UE associated with allocating the buffer between downlink communications and uplink communications comprises a preference of the UE associated with allocating a percentage of the buffer to downlink communications or uplink communications.

6. The method of claim 4, wherein the transmitting comprises:
   transmitting the UE capability report to the network entity.

7. The method of claim 1, wherein communicating, with the network entity, the data comprises:
   communicating using a first radio access technology and a second radio access technology according to the dual-connectivity mode.

8. The method of claim 1, further comprising:
   determining that the UE is configured to operate in the dual-connectivity mode, wherein identifying the second threshold size capability for the buffer is based at least in part on determining that the UE is configured to operate in the dual-connectivity mode.

9. The method of claim 1, further comprising:
   determining that the UE is configured to operate in at least one of the standalone mode or the dual-connectivity mode, wherein the first threshold size capability for the buffer is based at least in part on the determining that the UE is configured to operate in the standalone mode, and the second threshold size capability for the buffer is based at least in part on determining that the UE is configured to operate in the dual-connectivity mode.

10. The method of claim 1, further comprising:
    identifying an updated threshold size capability for the buffer based at least in part on identifying a change of activity status of the UE; and
    transmitting, to the network entity serving the UE, a third indication of the updated threshold size capability for the buffer.

11. The method of claim 10, further comprising:
    identifying the change of activity status of at least one of a plurality of subscriber identification modules of the UE, a sidelink communication, a position of the UE, or a combination thereof, the updated threshold size capability for the buffer is identified based at least in part on the identifying the change of activity status.

12. The method of claim 1, further comprising:
    periodically measuring one or more parameters associated with the UE;
    identifying an updated threshold size capability for the buffer based at least in part on the periodically measuring the one or more parameters; and
    transmitting, to the network entity serving the UE, a third indication of the updated threshold size capability for the buffer.

13. A method for wireless communication at a network node, comprising:
    receiving, from a user equipment (UE), a first indication of a first threshold size capability for a buffer of a protocol layer of the UE associated with a standalone mode and a second threshold size capability for the buffer of the protocol layer of the UE, different from the first threshold size capability, associated with a dual-connectivity mode, and a second indication of a preference of the UE associated with allocating the buffer between downlink communications and uplink communications;

determining a size capability for the buffer of the UE based at least in part on the received first indication, the second indication, or both;

determining, based at least in part on the determined size capability for the buffer, the preference of the UE associated with allocating the buffer, or both, a schedule of resources to use to transmit data to the UE; and communicating, with the UE, the data according to the determined schedule.

14. The method of claim 13, wherein the communicating comprises:

transmitting, to the UE, downlink data scheduled based at least in part on the received first indication, second indication, or both.

15. The method of claim 13, wherein the communicating comprises:

transmitting, to the UE, scheduling information for uplink data scheduled by the UE based at least in part on the received first indication, second indication, or both; and receiving, from the UE, the uplink data according to the transmitted scheduling information.

16. The method of claim 13, wherein determining the size capability comprises:

determining the size capability for the buffer based at least in part on the received first indication, a size of unacknowledged data for an uplink communication, an estimate of a size of a reordering buffer for downlink communication based at least in part on a state of at least one radio link control, or a combination thereof.

17. The method of claim 13, wherein receiving the first indication of the first threshold size capability and the second threshold size capability comprises:

receiving, from the UE, the first indication of the first threshold size capability and the second threshold size capability in a UE capability report in a radio resource control signaling, or in a medium access control (MAC) control element.

18. The method of claim 17, wherein the preference of the UE associated with allocating the buffer between downlink communications and uplink communications comprises a preference of the UE associated with allocating a percentage of the buffer to downlink communications or uplink communications.

19. The method of claim 13, wherein communicating, with the UE, the data comprises:

communicating using a first radio access technology and a second radio access technology according to the dual-connectivity mode.

20. The method of claim 13, wherein the first indication of the second threshold size capability for the buffer is based at least in part on the UE operating in the dual-connectivity mode.

21. The method of claim 13, wherein the first indication of the first threshold size capability for the buffer is based at least in part on the UE operating in the standalone mode.

22. The method of claim 13, further comprising:

receiving, from the UE, a third indication of the first threshold size capability for the buffer and a fourth indication of the second threshold size capability for the buffer, wherein the first threshold size capability for the buffer is based at least in part on the UE operating in the standalone mode, and the second threshold size capability for the buffer is based at least in part on the UE operating in the dual-connectivity mode; and determining the first threshold size capability for the buffer based at least in part on the third indication and the second threshold size capability for the buffer based at least in part on the fourth indication.

23. The method of claim 13, further comprising:

receiving, from the UE, a third indication of an updated threshold size capability for the buffer, wherein the third indication of the updated threshold size capability for the buffer is based at least in part on a periodic measurement of one or more parameters at the UE; and determining the updated threshold size capability for the buffer based at least in part on the third indication.

24. The method of claim 13, further comprising:

receiving, from the UE, a third indication of an updated threshold size capability for the buffer, wherein the third indication of the updated threshold size capability for the buffer is based at least in part on a change of activity status of the UE; and determining the updated threshold size capability for the buffer based at least in part on the third indication.

25. An apparatus for wireless communication at a user equipment (UE), comprising:

one or more processors, one or more memories coupled with the processors; and instructions stored in the one or more memories and executable by the one or more processors to cause the apparatus to:

identify a first threshold size capability for a buffer of a protocol layer of the UE associated with a standalone mode and a second threshold size capability for the buffer of the protocol layer of the UE, different from the first threshold size capability, associated with a dual-connectivity mode;

transmit, to a network entity serving the UE, a first indication of the first threshold size capability and the second threshold size capability for the buffer, and a second indication of a preference of the UE associated with allocating the buffer between downlink communications and uplink communications; and communicate, with the network entity, data that is scheduled based at least in part on the transmitted first indication, second indication, or both.

26. The apparatus of claim 25, wherein the instructions to communicate are executable by the processor to cause the apparatus to:

receive, from the network entity, downlink data scheduled based at least in part on the transmitted first indication, second indication, or both.

27. The apparatus of claim 25, wherein the instructions to communicate are executable by the processor to cause the apparatus to:

receive, from the network entity, scheduling information for uplink data scheduled based at least in part on the transmitted first indication, second indication, or both; and transmit, to the network entity, the uplink data according to the received scheduling information.

28. The apparatus of claim 25, wherein the instructions to transmit the first indication of the first threshold size capability and the second threshold size capability are executable by the processor to cause the apparatus to:

transmit the first indication of the first threshold size capability and the second threshold size capability in a UE capability report in radio resource control signaling.

29. The apparatus of claim 25, wherein the instructions to transmit the first indication of the first threshold size capability and the second threshold size capability are executable by the processor to cause the apparatus to:
transmit, to the network entity serving the UE, the first indication of the first threshold size capability and the second threshold size capability in a medium access control (MAC) control element.

30. An apparatus for wireless communication at a network node, comprising:
one or more processors,
one or more memories coupled with the processors; and
instructions stored in the one or more memories and executable by the one or more processors to cause the apparatus to:
receive, from a user equipment (UE), a first indication of a first threshold size capability for a buffer of a protocol layer of the UE associated with a standalone mode and a second threshold size capability, different from the first threshold size capability, associated with a dual-connectivity mode, and a second indication of a preference of the UE associated with allocating the buffer between downlink communications and uplink communications;
determine a size capability for the buffer of the UE based at least in part on the received first indication, second indication, or both;
determine, based at least in part on the determined size capability for the buffer and the preference of the UE associated with allocating the buffer, a schedule of resources to use to transmit data to the UE; and
communicate, with the UE, the data according to the determined schedule.

* * * * *